US009305086B2

(12) United States Patent
Amine et al.

(10) Patent No.: US 9,305,086 B2
(45) Date of Patent: Apr. 5, 2016

(54) NUMERIC CHANNEL TUNER AND DIRECTORY SERVER FOR MEDIA AND SERVICES

(71) Applicant: WorldRelay Inc, Austin, TX (US)

(72) Inventors: Gilbert A. Amine, Austin, TX (US); Andrei Cojocaru, Iasi (RO); Joseph Robert Coward, Austin, TX (US)

(73) Assignee: WorldRelay, Inc., Austin, TX (US)

( * ) Notice: Subject to any disclaimer, the term of this patent is extended or adjusted under 35 U.S.C. 154(b) by 96 days.

(21) Appl. No.: 13/901,732

(22) Filed: May 24, 2013

(65) Prior Publication Data

US 2014/0351870 A1   Nov. 27, 2014

(51) Int. Cl.
| | |
|---|---|
| H04N 21/266 | (2011.01) |
| H04N 21/85 | (2011.01) |
| G06F 17/30 | (2006.01) |
| H04N 21/2665 | (2011.01) |
| H04N 21/2668 | (2011.01) |
| H04N 21/858 | (2011.01) |
| H04L 29/06 | (2006.01) |
| H04L 29/12 | (2006.01) |
| H04H 20/00 | (2009.01) |
| H04N 21/414 | (2011.01) |
| H04N 21/436 | (2011.01) |
| H04N 21/438 | (2011.01) |
| H04N 21/482 | (2011.01) |

(52) U.S. Cl.
CPC ........... *G06F 17/3082* (2013.01); *H04H 20/00* (2013.01); *H04L 61/1582* (2013.01); *H04L 65/00* (2013.01); *H04L 67/38* (2013.01); *H04N 21/2665* (2013.01); *H04N 21/2668* (2013.01); *H04N 21/414* (2013.01); *H04N 21/4383* (2013.01); *H04N 21/43615* (2013.01); *H04N 21/4823* (2013.01); *H04N 21/8586* (2013.01)

(58) Field of Classification Search
CPC ............................... H04N 7/17; H04N 21/266
USPC .......................................................... 725/92
See application file for complete search history.

(56) References Cited

U.S. PATENT DOCUMENTS

| 8,116,808 B2 | 2/2012 | Amine | |
|---|---|---|---|
| 2002/0090934 A1* | 7/2002 | Mitchelmore | 455/412 |
| 2009/0228774 A1* | 9/2009 | Matheny et al. | 715/201 |

(Continued)

OTHER PUBLICATIONS

Get the Android SDK, Retrieved from the Internet on May 24, 2013:<URL:http://developer.android.com/sdk/index.html>, 1pg.

(Continued)

*Primary Examiner* — Jefferey Harold
*Assistant Examiner* — Justin Sanders
(74) *Attorney, Agent, or Firm* — Honigman Miller Schwartz and Cohn LLP

(57) ABSTRACT

Embodiments disclosed herein describe an apparatus, method and system for indexing online media content and services into numeric channel numbers and enabling a user device to access such content and services by entering the channel numbers. Embodiments may include a media and services tuner software module that resides on a user device and a directory server. The directory server may include a request module configured to receive a request including instructions to provide users access to content or services. Embodiments may also include a database module configured to determine a uniform resource locator for a server associated with the channel number within the received request.

19 Claims, 17 Drawing Sheets

(56) References Cited

U.S. PATENT DOCUMENTS

| | | | |
|---|---|---|---|
| 2011/0083167 A1* | 4/2011 | Carpenter et al. | 726/4 |
| 2012/0011550 A1* | 1/2012 | Holland | 725/78 |

OTHER PUBLICATIONS

The webapp2 Framework, Retrieved from the Internet on May 24, 2013:<URL:https://developers.google.com/appengine/docs/python/tools/webapp2>, 1 pg.

Datastore Overview, Retrieved from the Internet on May 24, 2013:<URL:https://developers.google.com/appengine/docs/python/datastore/overview>, 1 pg.

Cable Television Laboratories—Metadata 2.0 Specifications, Video-On-Demand Content Specification Version 2.0, MD-SP-VOD-CONTENT2.0-I02-070105. Published on Jan. 5, 2007. Retrieved from the Internet on May 24, 2013:<URL:http://www.cablelabs.com/specifications/MD-SP-VOD-CONTENT2.0-I02-070105.pdf>, 42 pgs.

Consumer Electronics Association—OpenEPG—A Specification for Electronic Program Guide Data Interchange, CEA 2033-2008 (ANSI). Published on Mar. 1, 2008, 103 pgs.

Wowza Media Systems, Inc.—Wowza Media Server 3—Overview. Published Dec. 2011. Retrieved from the Internet on May 24, 2013:<URL:http://www.wowza.com/resources/WowzaMediaServer3_Overview.pdf>, 21 pgs.

ZiiLabs, Inc.—Android Reference Tablets, a wide range of OEM ready tablet platforms. Retrieved from the Internet on May 24, 2013:<http://www.ziilabs.com/products/platforms/androidreferencetablets.php>, 1 pg.

Marvell Semiconductor, Inc.—ARMADA 1500 Series, Product Brief: Marvell 88DE3100 High-Definition Secure Media Processor System-on-Chip (SoC). Retrieved from the Internet on May 24, 2013:<http://www.marvell.com/digital-entertainment/armada-1500/assets/Marvell-ARMADA-1500-Product-Brief.pdf>, 2 pgs.

Ficstar Software, Inc.—Automated web scraping. Retrieved from the Internet on May 24, 2013:<http://ficstar.com/sitev2/?url=index>, 1 pg.

Wikipedia—Google Glass. Retrieved from the Internet on May 24, 2013:<URL:http://en.wikipedia.org/wiki/Project_Glass>, 1 pg.

International Telecommunication Union—The international public telecommunication numbering plan, Recommendation ITU-T E.164. Published on Nov. 2010. Retrieved from the Internet on May 24, 2013:<URL:http://www.itu.int/rec/T-REC-E.164-201011-I/en>, 32 pgs.

\* cited by examiner

400

BBC1 (1001)
StreamVu (1234)
France 24 (55243)
Austin Little League (55244)
Nurse Patti (Telemedicine) (55245)
Car Racing Game (55246)
Delilah the Fortune Teller (55247)
Times Square Live Webcam (55248)
KXAN-TV (78736)
KKRW 95.5 FM (78795)
The Autism Channel (242424)
John Smith (5125551234)
Carmelo's Restaurant (5127871772)
Elizabeth Jones (7185557654)

FIG. 4

Edit Channel Austin Little League for Media LLC

Provider ID: 9898 — 500
Channel ID: 55244 — 501
Name: Austin Little League — 502
Active?: ☒ — 503
Tag 1: Youth Baseball
Tag 2: Minor - Broncos    } — 504
Type: Misc Video — 505
Genre 1: Sport
Genre 2: Other
Genre 3: Other    } — 506
City: Austin
State: TX
Country: US    } — 507
Language: English — 508
Website: http://www.austinlittleleague5.com — 509
Guide: http://www.125.456.987/guide.epg — 510
Call-in function?: ☒
Call-in number: 1-512-5557654    } — 511
Advertiser Interaction?: ☒
Advertiser Method: E-Mail    } — 512
Subscription Plan: Open — 513
Parental Control: Y — 514
Channel Format: Streaming Video — 515
Channel Image?: ☒
Channel Image File: P:\channels\files\alg_icon\austin_league2.jpg    } — 516 — 517
Channel Info: Live and On-Demand Austin Little League Sports Coverage
Channel Content Type: Streaming Video
Audio Codec: AAC
Audio Content Location: http://123.456.987/mediallc/audio/austinleague3.mp4    } — 518
Visual Content Type: Streaming Video
Visual Content Format: H.264    } — 519
Visual Content Location: http://123.456.987/mediallc/austinleague3.xml — 520

FIG. 5

NUMERIC CHANNEL TUNER AND DIRECTORY SERVER FOR MEDIA AND SERVICES

FIELD OF THE DISCLOSURE

The disclosed subject matter is in the field of online media and services, more particularly, the addressing, provisioning, and interacting with online media, communication and other services via broadband networks.

BACKGROUND

There is a rapid growth in the number of audio, video, and other media content that is available through the Internet. Traditional radio and TV stations, are increasingly streaming their programs over the Internet and new online stations are growing in popularity. The cost and complexity that is associated with becoming a "broadcaster" are decreasing, making it possible for smaller groups, such as churches and kids sports leagues to stream their media content over the Internet to viewers around the world.

Historically, Internet content was accessed by web browsers running on personal computers (PC). Search engines are used today to locate and access much of the content that is available on the Internet through web links. This approach is inefficient and less than desirable, as content from broadcasters with similar names or descriptions may be found by search engines. Often, the web links to the content are broken or the content is not compatible with the formats supported by the media players on the PC. Aggregators have attempted to address some of these issues by providing directories of some of the content, such as Internet radio stations or ethnic Internet TV. There many issues with aggregation-based directories or applications including the limitations to the type or geographic content that are supported by aggregators. Other limitations such as broken web links and incompatibility between formats are often present.

While the current system of using search engines, aggregation services, and other applications may be somewhat passable on PCs and smart phones, it is significantly more difficult on new types of broadband-connected devices such as smart TVs, blu-ray players, streaming boxes, cable set top boxes (STBs), in-car entertainment systems, which lack a full keyboard and in many cases an Internet browser. Aggregators are attempting to provide solutions to this problem and are developing dedicated applications for some of these platforms. These applications have their own user interface and limitations to the type of content that they support. Their user interface usually includes a menu selection system organized by content type with a text search facility. However, this organization of content by aggregators is not suitable for use in connected devices with a simple remote controller, utilizing numbers and simple navigation buttons. Furthermore, different aggregators may have different content and menu selection options.

Currently, there is no way for users of smart TVs and other connected entertainment devices to access the vast array of content that is available on the Internet and other broadband data networks.

Cable, telephone company (telco), and satellite TV operators have offered limited programming using a simple user interface based on channel numbers. Users are accustomed to such a means for accessing content from these providers, but have a limited selection. The channel numbering schemes that are used by operators are limited to their own systems and are not compatible with those from their competitors. In fact, they differ from region to region. For example, channel 17 on Time Warner Cable in Austin, Tex. may not be the same one as channel 17 on AT&T U-Verse in Austin or channel 17 on Time Warner Cable in Oklahoma City, Okla. Furthermore, the channels that are supported by the operators are limited to the content that they provide as a part of their subscription packages. There is no simple way for specialty broadcasters or individuals to offer their content through such systems.

BRIEF SUMMARY

The following presents a simplified summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

The disclosed subject matter encompasses a numeric addressing scheme for accessing media content and services over broadband networks. The media content may include but is not limited to: live and on-demand broadcast and Internet radio and TV, webcams, streaming video of events, infomercials, smart phone live streaming video, digital signage, digital art, and websites. Services may include but are not limited to: voice and video communication, telemedicine, online gaming, intelligent personal assistance, remote tourism, interactive media, interactive advertising, augmented reality, online shopping, play list, content sharing, and social networking.

Another aspect of this disclosure is real-time updating of streaming activity by broadcasters to subscribers, and a notification to broadcasters when subscribers are tuning to their channel to more efficiently deliver of contents and services.

In another respect, this disclosure encompasses the provisioning of media, communications, and other services in a numbering plan, which may be a superset of the international telephone numbering plan (defined by ITU E.164). In embodiments, telephone calls and access to content and services are utilized via a non-conflicting numbering plan. The embodiments enable the creation of a media distribution and online services network similar in open access and universality to the public telephone network. Content and services are all addressable as channel numbers.

Another aspect of this disclosure is to bookmark and map numeric channel numbers to Uniform Resource Locators (URLs) to provide streaming media and other services. These channels numbers, and therefore the content and services that relate to the URLs that they are associated with, can be accessed from Internet connected devices with numeric keypads, such as smart TV and blu-ray player remote controllers, game console controllers, Voice over IP (VoIP) telephones, video telephones, in-car entertainment systems, cordless telephones and basic mobile telephones. The channels can also be accessed from devices with other forms of a user interface, such as keypads, keyboards, pointers, joysticks, touch screens, and voice input.

Another aspect of this disclosure is a method and system for content providers to reserve a channel. Content providers may associate URLs for servers associated with the content provider's content, services, and subscription requirements so users may access that content and/or service across multiple platforms by performing actions to input a single channel number, which may be associated with a URL.

Another aspect of this disclosure is a method and system supporting using telephone numbers as channel numbers, thus making it possible for every telephone and smart phone subscriber to become a "broadcaster". This form of addressing may leverage the numbering systems and also support new types of services that combine media (such as streaming audio, images, and/or video), communication services (such as voice calling, video calling, SMS texting), and other services (such as gaming, intelligent personal assistance, content sharing, and social networking).

Another aspect of this disclosure is an automated method and system supporting for crawling the worldwide web, identifying sources of live media streaming and other services, and assigning channel numbers to the live media streaming and other services. In further embodiments, the live media streaming and other services may be linked to, downloaded and/or stored on a server. In embodiments, the live media and other services may include photos for a slideshow (including any comments), logos, text from blogs associated with the media source, etc, which may bring more content from the media originator to the user. By entering a channel number on a user interface, the user's device may be redirected to the mapped URL, which is associated with the identified source of content or service.

BRIEF DESCRIPTION OF THE DRAWINGS

The disclosed subject matter will hereafter be described with reference to the accompanying drawings, wherein like reference numerals denote like elements, and:

FIG. 4 illustrates an exemplary channel directory, according to an embodiment;

FIG. 5 illustrates an example directory channel configuration, according to an embodiment;

Figure 1:
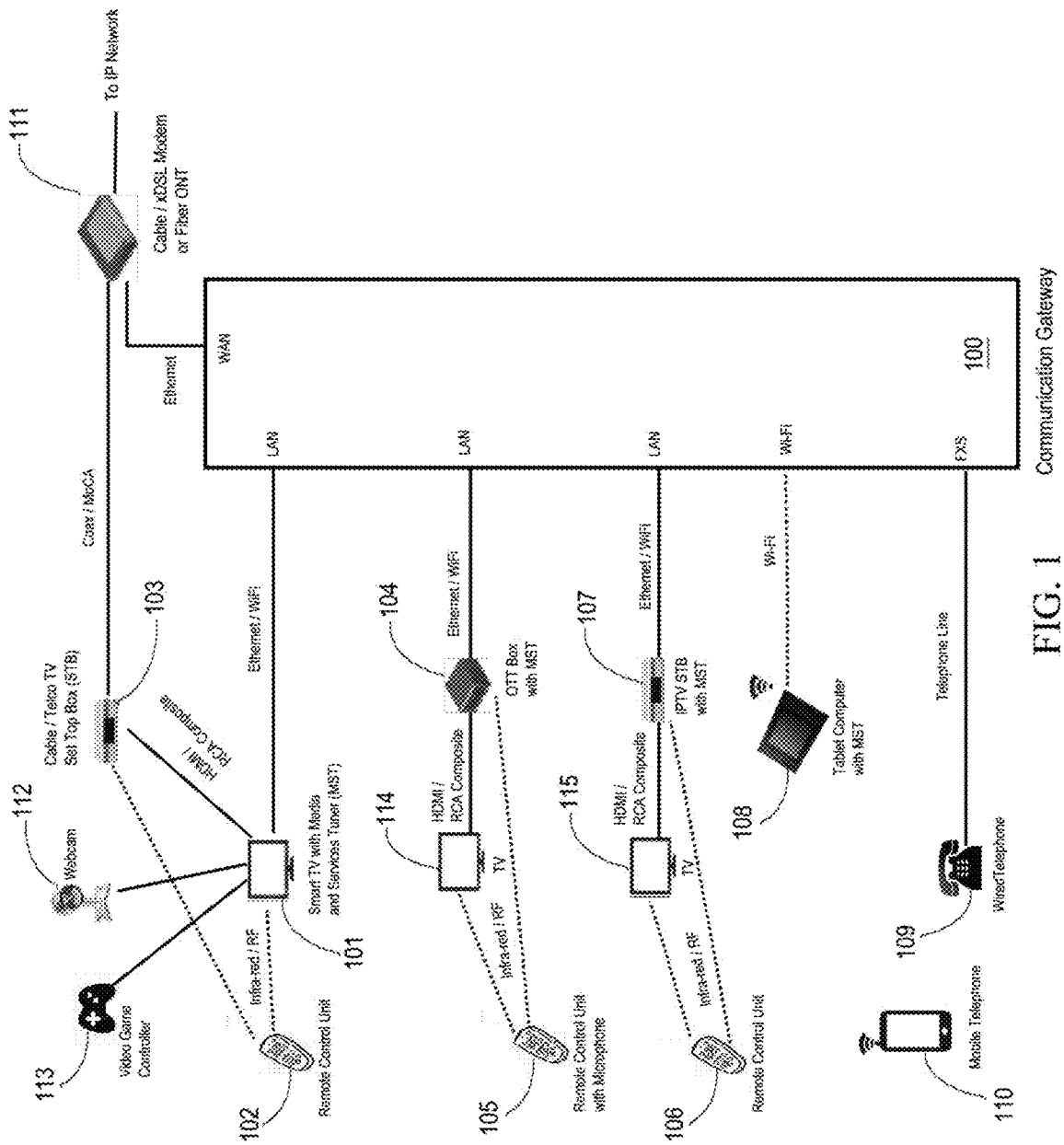
FIG. 1 illustrates a typical connection diagram for user devices to access TV, online media, communications, and other services, according to an embodiment.

While the disclosed subject matter is susceptible to various modifications and alternative forms, specific embodiments thereof have been shown by way of example in the drawings and are herein described in detail. It should be understood, however, that the description herein of specific embodiments is not intended to limit the disclosed subject matter to the particular forms disclosed, but on the contrary, the intention is to cover all modifications, equivalents, and alternatives falling within the spirit and scope of the disclosed subject matter as defined by the claims.

DESCRIPTION OF EXEMPLARY EMBODIMENTS

One or more specific embodiments of the disclosed subject matter will be described below. It is specifically intended that the disclosed subject matter not be limited to the embodiments and illustrations contained herein, but include modified forms of those embodiments including portions of the embodiments and combinations of elements of different embodiments as come within the scope of the following claims. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the disclosed subject matter unless explicitly indicated as being "critical" or "essential."

The disclosed subject matter will now be described with reference to the attached figures. Various system components, devices, and software modules are schematically depicted in the drawings for purposes of explanation only and so as to not obscure the disclosed subject matter with details that are well known to those skilled in the art. Nevertheless, the attached drawings are included to describe and explain illustrative examples of the disclosed subject matter. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

This invention disclosure provides example embodiments to enable someone skilled in the arts to understand and offer the proposed solution. These example embodiments are not the only way that such solutions can be developed. Advances in technology allow components to be combined and software functions to be segmented and implemented at different system components. This is especially true for complex systems, such as the ones that are used in this disclosure. Furthermore, it should be noted that with open systems and the publication of Software Development Kits (SDKs), that a lot of software functionality has become available to developers enabling rapid development. In this disclosure, the inventors make use of such open systems and SDKs in the disclosed embodiments. Software architecture may vary across supported platforms (smart TV versus tablet, for example) and vendors (Yahoo! Connected TV versus Google TV/Android), yet someone skilled in the art should be able to implement the disclosed embodiments using similar approaches, even if the specifics for the implementation may vary.

FIG. 1 illustrates one embodiment of a network topology for user devices to access TV, online media, and communications services. A communication gateway 100, such as a residential gateway may be configured to communicate wired and wireless data received over a network at a given location. In embodiments, communication gateway 100 may be configured to operate in conjunction with a broadband modem 111 (cable, xDSL, or fiber). FIG. 1 illustrates a smart TV 101 that may be configured to receive media and services from via a broadband connection. The broadband connection may be wired, i.e. Ethernet based or wireless, such as Wi-Fi (such as 801.11n)—based. In embodiments, a wireless adapter may be externally connected to the smart TV 101 through a USB adapter (not shown). Smart TVs 101 may be operated through a remote control unit 102 to control such functions as channels, volume level, etc. In embodiments, remote control units 102 may be configured to operate with infra-red communication, while in other embodiments remote control unit 102 may be configured to operate with radio frequency (RF) for communication with the smart TV 101. Smart TV 101 may have one or more video and audio ports, such as HDMI or the older RCA composite to enable audio-visual devices such as blu-ray players (not shown) and set-top boxes (STB) 103 to be connected to smart TV 101. These devices may be configured to communicate media and services to be displayed on a display of smart TV 101. Smart TV 101 may also be configured to utilize USB host ports to enable peripheral devices, such as USB memory sticks (not shown), webcams 112, or video game controllers 113, to be connected to the smart TV 101. In one embodiment, smart TV 101 may support multiple HDMI ports and RF remote control and USB peripherals, while a lower end model may have fewer HDMI ports, no USB, and an infra-red remote.

Smart TV 101 may communicate data over the Internet via a broadband interface(s). Smart TV 101 may also be configured to provide the user access to bundled OTT programming services such as Netflix, Amazon Instant Video, HULU, Pandora, and others. Smart TV 101 may also be configured to support a full open operating system, such as Google TV, and/or support programmable "widgets" through an open platform such as the Yahoo! Connected TV. The use of an open operating system or widget platform enables third party application developers to communicate data over the Internet for applications to run on smart TV's 101 platforms. Thus, a Media and Services Tuner (MST) client software module may reside and operate on smart TV 101 or other connected user devices shown in FIG. 1. Such client software module enables users to access online content and interact with communication and other services via smart TV 101.

The network topology of FIG. 1 illustrates a cable/telco TV STB 103 being communicatively coupled to devices within the network topology. STB 103 may be configured to utilize a coax distribution wiring to receive subscription TV signals using RF-modulated signals, such as DOCSIS. In embodiments, STB 103 may be configured to employ the Multimedia over Cable Alliance (MoCA) interfaces to communicate data associated with high-speed digital TV and Internet data across a network using coax and other cables. In embodiments, STB 103 may be configured to include an MST client software module. FIG. 1 also depicts an OTT box 104 (which may also be referred to interchangeably as a streaming media box), such as devices may be made by Apple, Boxee, D-Link, Roku, etc. OTT box 104 may be configured to enable streaming of OTT content (such as media content from Netflix, Amazon Instant Video, etc.) across the Internet to be displayed on an external TV 114. Blu-ray players may have an Internet connection and similar streaming capabilities as the OTT box 104. OTT box 104 and blu-ray players may feature an open platform, such as those offered by Google TV or Roku, to enable third parties to develop software modules that may be downloaded by OTT box 104 for access to certain content or for new features. In embodiments, OTT box may include an MST client configured to operate on user devices running the various operating systems. In embodiments, OTT box 104 may also include a server-side component configured to communicate with the OTT box 104. OTT box 104 and IPTV STB 107 may be communicatively coupled to TVs 114 and 115, respectively, via interfaces. The interfaces may be configured to communicate data from OTT box and IPTV STB 107, which may be interfaces such as HDMI and RCA composite.

STB 103, OTT box 104, and IPTV STB 107, may include remote control such as 102, 105 and 106, respectively. In embodiments, STB 103, OTT box 104, and IPTV STB 107 may be communicatively coupled to a respective remote control 102, 105, 106 via infra-red protocol, RF-based protocol, etc. In embodiments, radio-based remote control units, such as remote control 105, may include a microphone configured to receive voice input from the user to enable voice commands and voice telephony. In other embodiments, remote control 102, 105, 106 may have an interface with numbers, navigation buttons, and a function buttons. A user may perform actions via the interface on remote control 102, 105, 106 to input data to access content and/or services. In embodiments, access to the content and/services from OTT providers (Netflix, Amazon Instant Video, etc.) may be access via remote control 102, 105, 106 via dedicated buttons on the remote control 102, 105, 106 or top level menu selection that may appear on a display of TV 101, 114, 115 that can readily selected. However, users of conventional remote control units may not have a way to directly access content or services other than those appearing on the a device's menu system.

In disclosed embodiments, an MST client application is configured to provide a way for the user to access a large number of content and services by entering associated channel numbers. The MST client application may run on supported smart TVs 101, OTT boxes 104, IPTV STB 107, telco/cable TV STB 103, blu-ray players (not shown), game consoles (not shown), tablet computers 108, VoIP telephones (not shown), video telephones (not shown), basic mobile telephones (not shown), smart phones 110, personal computers (not shown), in-car entertainment systems (not shown), or any other computing device with a processor configured to receive and transmit communications over a network. These user devices may include user interfaces, such as touch screens, keypads, keyboards, external remote, etc. configured to receive inputs from a user associated with a numerical identifier. Other user devices may include a microphone input or gesture detection sensors for enabling users to enter or select numbers. In embodiments, channels associated with a numerical identifier may be unique, making it possible to access services and content from large and small broadcasters. Embodiments may utilize a universal access mechanism to access various types of streaming media content, communications, and services on the client devices As depicted in FIG. 1, communication gateways 100 may include analog telephone ports. Users can plug their existing wireless (not shown) or wired telephone 109 to the Foreign eXchange Station (FXS) port on communications gateway 100. In embodiments, communications gateway 100 may provide VoIP services by a broadband service operator. In embodiments, the user may subscribe to regular telephone service from the local telephone service provider and have a Public Switched Telephone Network (PSTN) telephone connection (not shown), bypassing the communication gateway. In embodiments, a user may have a mobile phone 110 available in conjunction with mobile telephone service.

Figure 2:
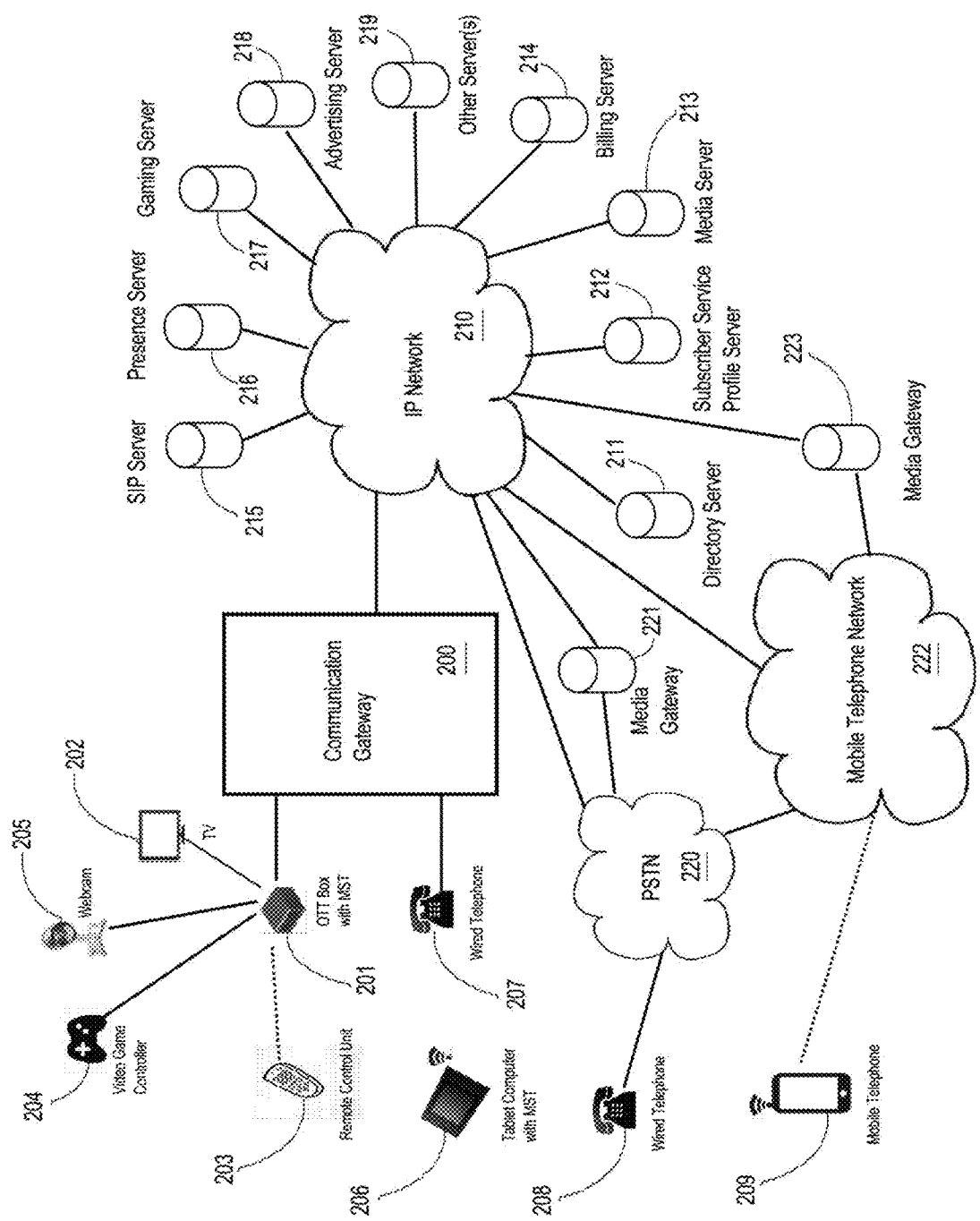
FIG. 2 illustrates selected elements of a high-level diagram of major system, according to an embodiment.

As one skilled in the art will appreciate, FIG. 1 depicts only one network topology utilized by embodiments. Other network topologies may be associated with businesses, hotels, public information terminals, in-car entertainment systems, airplane in-seat terminals, and others. Such network topologies have many elements in common with FIG. 1, and/or additional elements that are not shown FIG. 2 illustrates selected elements of a network topology according to one embodiment. As depicted in FIG. 2 a communication gateway 200 may be communicatively coupled to OTT box 201, home telephone 207, and IP networks 210. In embodiments, communication gateway 200 may be configured to communicate data to and from OTT box 201 and home telephone 207, such as via broadband. OTT box 201 may include an MST client application may be configured to access content and services according to embodiments. The OTT box 201 may be communicatively coupled to a TV 202, and OTT box 201 may be controlled by a remote control unit 203. A webcam 205 and a video game controller 204 are shown to illustrate that peripheral devices may be communicatively coupled to the OTT box 201 for expanded functions, such as video telephony and gaming. Other peripherals devices such as blood pressure measurement devices, home automation units, and others may be communicatively coupled through a wired interface, such as USB or via wireless interfaces such as Bluetooth. FIG. 2 also depicts a tablet computer 206 with MST client application. A home telephone 207 may connect to a telephone port on the communication gateway 200. A second home telephone 208 may be connected directly to the PSTN 220. In embodiments, communication gateway 200 may be configured for Internet Protocol (IP) connectivity across one or more IP networks 210 which may include the public Internet. The communication gateway 200 may also be configured to provide IP connectivity to one or more private data networks or to a hybrid of public and private IP networks.

The Directory Server 211 may be configured to perform a look up function between channel numbers and URLs and services that can be connected through IP networks. The Directory Server 211 may also incorporate a directory function enabling the user to look up channels based on criteria such as: a content or a service type, language, geographic location, subscription requirements, etc. In embodiments, Directory Server 211 may also be configured to provide brief information, a background picture, and some function buttons associated with the channels.

The Subscriber Service Profile Server (SSPS) 212 may include a data base configured to store information about the user, which may be referred to interchangeably within this disclosure as "subscriber." Such information stored within the database may include the user's name and address, the type of the user's devices, manufacturer of the user's connected devices, and model of the user's connected devices, the user's main and secondary telephone numbers, the user's favorite channels for each or all of the connected devices, the user's inputted parental guidance restrictions, the user's subscription restrictions, and other information associated with the user. Software for subscriber services management associated with SSPS 212 may be available from many providers (such as GLDS, OTT Networks, etc.) and can be customized for use by SSPS 212. Additionally, the network topology depicted in FIG. 2 includes a billing server 214 which may be configured to process services purchases, product purchases, and donations which require monetary payments associated with content communicated the user's devices. The network topology depicted in FIG. 2 includes media server 213, which may be configured to stream multimedia (audio and/or video) content to the user's device. In embodiments, media server 213 may be configured to provide such features as data encoding and encapsulation, communication protocols, digital rights management, encryption, etc to the multimedia content communicated to the user's devices. In this disclosure all references to a media server are generic. They may include a single or a multitude of servers or a content delivery network (CDN).

The network topology depicted in FIG. 2 includes a Session Initiation Protocol (SIP) server 215, which may be configured to communicate voice or video telephony data between the user's device and content channel providers, content program providers, advertisers, PSTN, VoIP, and mobile telephone subscribers, and other users; devices. In embodiments, presence server 216 may be configured to provide real-time presence notification to the user's device and/or broadcaster under certain conditions, such as when content associated with a channel goes live. FIG. 2 shows a gaming server 217 configured to host online games for online gaming platforms. An advertising server 218 may be configured to provide advertising based on rules derived from such sources as the user's information (communicated from the SSPS 212 and/or other sources), user channel access history, current channels, and programs on a channel, geographical location, and others. Advertising server 218 may be configured to track channel activity by the users on the user devices and communicate analytics data reports to content providers and users to enable more relevant programming and targeted advertising, such as interactive advertising. The advertising server 218 may also be configured to provide advertisement insertion in conjunction with a channel, subscription plan, a service, or other criteria.

The topology as depicted in FIG. 2 includes other servers 219 configured to support value-added services by third parties. Such other services 219 may include speech recognition and intelligent personal assistance, augmented reality, virtual tourism, etc. FIG. 2 also shows typical interconnection to the PSTN 220 and mobile telephone networks 222 via media gateways 221 and 223, respectively.

It should be noted that not all the system components are required for some embodiments. In addition to the connected user device (OTT box 201 or tablet computer 206 in FIG. 1), an IP network 210, only Directory Server 211 and one media server 213, SIP server 215, or service-related server may be desired or required. Other servers and telephones are shown for enhanced services but may not be required for basic operation. In embodiments, communication gateway 200 may not be required if the connected user device is directly accessing the IP networks 210. Examples include a mobile telephone 209 with data capability or a TV with a WiMax USB adapter. It should also be noted that some system components may be combined or subdivided into two or more. For example, the SSPS 212 may be combined with the billing server 214.

Likewise, the advertising server 218 may be divided into an advertising management server 218 and a separate analytics server.

It should also be noted that the system components shown in FIG. 2 may be incorporated into IP Multimedia Subsystems (IMS) based on standards developed by the $3^{rd}$ Generation Partnership Project (3GPP) as these standards evolve to include support for smart TVs and entertainment devices and as required by the market. Some embodiments do not require the presence of IMS by the broadband service provider but can be integrated with it, if and when necessary.

Figure 3:
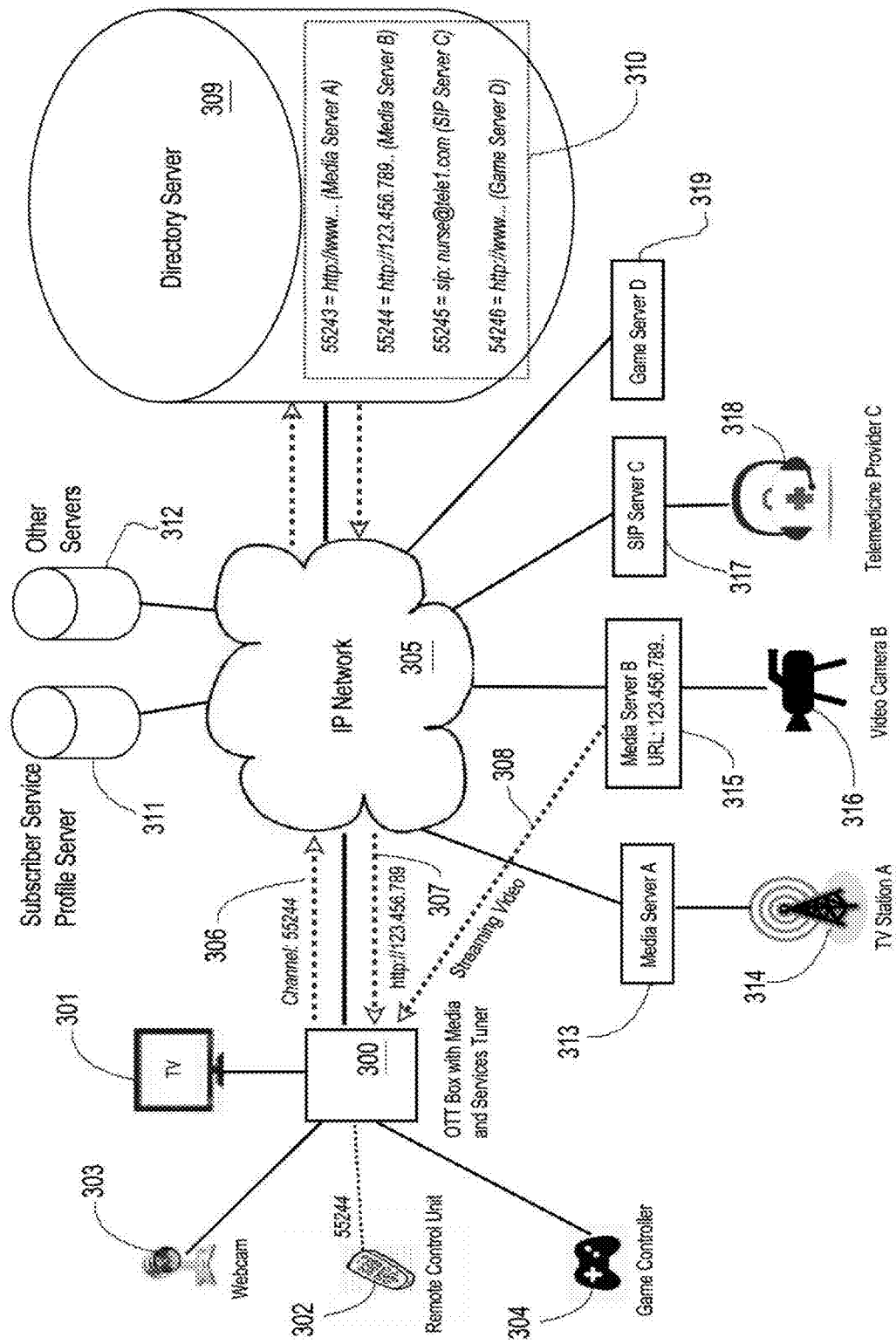
FIG. 3 illustrates an exemplary simplified channel look up and connection, according to an embodiment.

FIG. 3 illustrates an exemplary simplified channel look up and connection network topology according to an embodiment. As depicted in FIG. 3, an OTT box with MST client software module 300 is communicatively coupled with a TV 301 and remote control unit 302. An optional webcam 303 and an optional game controller 304 are also shown. It is assumed that the OTT box 300 is able to connect to IP networks 305 through a communication gateway, a router, a WAN modem or some other means. FIG. 3 also shows a Directory Server 309, a SSPS server 311, two media servers 313 and 315, a SIP server 317, and a game server 319 being communicatively coupled with each other. Other servers 312 may also be present in the system and may include, but are not limited to one or more of the servers that are shown in FIG. 2.

FIG. 3 shows the Directory Server 309 with a look up table 310. Look up table 310 may include entries that map a channel number with URLs of servers that are used to provide the content and/or service(s) for it. For example, channel 55243 corresponds to feed from TV station A 314 and can be accessed at a given web address. Channel 55244 corresponds to a live feed from video camera B 315 streaming a sports event, a religious service, a corporate event, a panoramic view from a resort, a feed from video camera of a smart phone, or other content. When the user enters 55244 on his or her remote 302, the OTT box 300 transmits a query 306 to the Directory Server 309, which looks up the URL associated with the channel within query 306 based on information in look up table 310 and responds to the OTT 300 both with this information 307. In the example shown in FIG. 3, the URL address corresponds to media server B 315 which is streaming audio and video content from video camera B 316. The MST client software module on the OTT box 300 (or other user device) recognizes the format as a video stream, establishes a connection with server B 315 and streams video 308 which displays the content using its streaming media player middleware (not shown).

FIG. 3 shows some example look ups for other channels in the table 310, such as channel 55245 featuring a videoconferencing connection with telemedicine provider C 318 via SIP server 317. Channel 55246 is a gaming channel provided by game server D 319 at its assigned URL address. Look up tables 310 in the Directory Server 309 may also provide multiple URLs for some services when a single URL will not suffice. This may include services such as video-on-demand. The SSPS 311 may provide service-related information to the Directory Server 309, such as whether there are restrictions against the user accessing it (such as a subscription requirement), or whether additional peripherals are needed, such as a webcam 303 for a video conference call. After a user enters a channel number on a user device, the Directory Server 309 may send a query to the SSPS to ascertain the user and device's capabilities and matches them against the requirements for that channel before proceeding with making the look up in 310 and providing the URL that is associated with the content or service.

In some disclosed embodiments, a Directory Server 309 may provide information about a single or multiple URLs to MST client software module on OTT box 300, which then streams the media content or accesses the service directly from the corresponding servers. There are other possible system-level implementations in which the Directory Server 309 may act as a proxy for other servers and provide the content to the MST. Hybrid implementations combining the two approaches are also possible and envisioned by this disclosure. Furthermore, the Directory Server 309 may download look up information to an MST client so that Directory Server 309 may perform the channel to URL mapping locally for faster user interface. In the case of multiple URLs, the client will determine which URL to choose based on criteria such as bandwidth, location, etc. A hybrid system whereby the MST client maintains some channel look up information (possibly for frequently accessed channels or genres) while others reside on Directory Server 309. Some embodiments may have more than one Directory Server 309. This may be desired for providing system redundancy, load balancing, and for faster access to geographically concentrated content. For example, a Directory Server 309 may be located in Australia to support Australian customers and content and service providers. Such channels may not be commonly accessed from the US. Some Directory Servers may query other Directory Servers (not shown) or provide the MST client the URL of another Directory Server 309 which can provide the look up It should be noted that the MST may have URLs of backup Directory Server 309 or servers, in case it may not able to connect with the primary one. This type of distributed server architecture may be used in support of IP-related services and provides redundancy, load sharing, and other benefits. Embodiments include variations on the topology that is shown in FIG. 3. For example, another server 312 may communicate with the Directory Server 309 on behalf of the OTT Box 300 and perform part of the tuning function on its behalf and stream the content to it. In this scenario, the user enters a channel number and a client software sends a query to the other server 312. The other server communicates with the Directory Server 309 and receives the URL that is associated with the channel and streams it directly to the OTT box. A hybrid system with some channel contents being provided or streamed by other server 312 or redirected to the URL of the media or other severs (such as 313, 315, 317, 319). References to Directory Server in this disclosure should be understood to also include a group of multiple Directory Servers that may be distributed over IP networks.

FIG. 4 shows an exemplary channel directory as seen by the user on the user's device screen in an embodiment. The channels in the channel directory may be mapped to corresponding URLs in a look up table. The example channel directory 400 is provided by a Directory Server, such as Directory Server 309 depicted in FIG. 3. The user may input commands on a user device to scroll through the channel list and select the content or service that he or she wants. He or she may also directly enter the channel number on the user device to access the corresponding content or service. The user also has the ability to look up channels by content type, genre, sub-genre, language, geographic location, and other criteria. Other listings are also possible such as popular channels and favorite channel listing that the user has pre-selected. It should be noted that some channels may be private and not subject to public directories. As such, they may not be displayed on listings. In embodiments, the Directory Server may communicate with presence servers and list intermittent broadcasters only when they are active (transmitting or able to transmit upon request by the user).

The example channel directory 400 illustrates the diversity of content and services that may be provided by some embodiments. BBC1 (channel 1001) and France 24 (channel 55243) are established TV broadcasters, while the Austin Little League (55244) is a private group that may occasionally stream local little league games. Nurse Patti—Telemedicine (channel 55245) is a channel associated with a telemedicine provider. Embodiments may require a paid subscription and may require a webcam for two-way video conferencing. A non-subscriber to a channel may not see the channel listed, or may see the channel grayed out and not accessible. In embodiments, the user may click on it and be redirected by the Directory Server to an informational channel from the telemedicine provider that describes the benefits of the service and how to sign up for the channel associated with the service or content. If the user is a subscriber to the channel, he/she may access the channel and have a video call with Nurse Patti. Channel 55246 is, in this example, a Car Racing Game, available on a gaming channel. The channel may require a subscription and may also require a game controller. The game engine may reside on the game server that is associated with the channel, at another server, or may be downloaded to the user device upon accessing the channel. The user device (OTT box, tablet, etc.) relays coordinates of the controller joystick, for example, and may locally process some or all of the gaming functions. Channel 55247, Delilah the Fortune Teller, is an interactive intelligent personal assistant system configured to emulate a real-life psychic. The intelligent personal assistant system may be capable of understanding human speech, perform cognitive functions and interact with the user and present audio, video, and data to the user's device. In embodiments, channel numbers may be used to connect with and interact with a multitude of intelligent personal assistants which can emulate real-life people such a psychologist, car mechanic, nurse, comedian, famous people, etc. Intelligent personal assistants may also be imaginary, such as Elmo, Santa Claus, etc taking on different "personalities". Embodiments such as Channel 55248 provides a webcam view of Times Square in New Work City, N.Y. If the TV is 3D-capable, the Directory Server may connect the user to another webcam from the same content provider that features true or simulated 3D imaging or augmented reality, enhanced by computer-generated sensory input and other content. Channel 78736 is an Austin, Tex. TV station, KXAN-TV, while channel 78795 is a local FM radio station with a slide show and interaction buttons. Channel 242424 corresponds to The Autism Channel, a niche Internet TV channel. In this example, Channel 5125551234 is assigned to John Smith, a smart phone user equipped with a wearable video camera, such as the Google Glass. The channel number in this case corresponds to John's mobile telephone number. In embodiments, only his friends and contacts may have John's mobile telephone number and he may not be want to be listed in public directories. Users can access this channel and speak with John, conduct a video call with him, or view the feed from his video camera, if he enables that capability via his mobile telephone number corresponding to a channel. Carmelo's Restaurant is assigned a channel number (5127871772) which corresponds to its published telephone number. This channel may feature video presentations about the restaurant, its chef, dishes, etc. It may also feature a button for the user to call and make a reservation. It should be noted that in addition to the long channel number that is associated with the telephone number, that some commercial-oriented channels may also have a short number that is easier to remember such as 55555. Some embodiments may support shortened channel numbers. Multiple channel numbers (e.g. one long and one shortened) may have the same look up URL associated with them. In the final example, Elizabeth Jones (7185557654) is a friend of the user and has a webcam associated with her smart TV, tablet and smart phone. When the user accesses her channel, the user may see which of the user's communication devices are active (through a presence server) and communicate an invite for the user to join a conference call to the user's active device(s). As was noted earlier, this directory is an example and other types of content and services may be supported by the disclosed embodiments.

FIG. 5 illustrates an example of directory channel configuration in an embodiment. FIG. 5 depicts fields such as:
a. Provider ID 500
b. Channel ID 501
c. Name 502
d. Active flag 503. When checked, the channel appears in directories
e. Tags 504
f. Channel type 505, such as radio, TV, webcam, online game, etc. The fields listed below it (506-520) and in FIG. 6 may depend on the type selected here. For example, if the channel type 505 was entered as a video conference, information such as SIP server location, video compression options, and others would be listed instead of the ones shown here.
g. Genres 506. Multiple genre fields are provided as some content or services may have more than one.
h. City, state, and country of the channel source 507
i. Language 508
j. Website associated with the channel 509
k. Location of electronic program guide 510
l. Telephone call-in information 511
m. Advertiser interactive flag and method 512
n. Subscription plan code, if required 513
o. Parental control code 514
p. Channel Format 515
q. Location of background image or icon associated with the channel 516
r. Information that should appear when the info button is pressed, or in directory listings 517
s. Audio stream location, for use when tuning in for live content from a radio or device with no video capability 518. MPEG4 encapsulation format is used in this example.
t. Video content type and format 519
u. URL associated with the audio/video content—may be a single address or multiple addresses for more complex channels, such as video-on-demand or online gaming 520

The information depicted in FIG. 5 may be entered by a content provider through an administrative interface or portal into the Directory Server. The information may also be generated by automated channel generation software such as the one illustrated in FIG. 12. The Directory Server may include a database which indexes the information and enables searches, updates, and report generation. The information within the database may enable faster look up of channel information associated with data requests from the MST client software module. It should be noted that some embodiments may support live streaming and on-demand content as well as services. Directory Servers in some embodiments may support indexing of channel-related services by means of a structured file using industry standard schemas for video-on-demand indexing (such as the one by Cable Labs and listed in the References). Structured files may also used to provide the desired information for communication and other services.

Some embodiments may desire or require content providers to provide their content using a select number of streaming, encoding, and encapsulating protocols, such as Apple HTTP Live Streaming (also known as HLS), H.264/AAC, and MPEG 4, respectively in order to ensure compliance with the supported client platforms. Personal computers may feature downloadable media players and browsers using a large number of protocols and formats, yet devices such as blu-ray players may have limited processing capabilities and/or memory and may not be able to run the necessary software for some of the systems that are commonly used on PCs. Content providers may provide their stream URLs, and/or files which index their video-on-demand and services. Content providers can use a compatible media server or use a transcoding server which can convert streams from some of the formats into a supported format such as those listed above. Likewise, a common Electronic Program Guide (EPG) format may be supported (and entered in 510). Requiring the use of a limited number of widely supported streaming media, on-demand programming, electronic program guides, and services can help ensure compatibility across a large number of devices. The use of transcoding servers and data translation servers may be required for connection to media servers and other servers using more proprietary formats.

Embodiments may support the association of multiple URLs to a single channel in order to enable the desired functionality. For example, a Directory Server may feature separate URLs for the streaming audio from a radio station and a separate URL link to provide accompanying visuals or services, including, but not limited to, an image slide show, the corresponding lyrics (derived from a service such as Shazam), or information about the CD being played and how to purchase it. The support for multiple links enables new content and services to be offered. This feature may enhance the user experience and make radio content more interesting to watch on a TV or tablet screen, for example.

Figure 6:
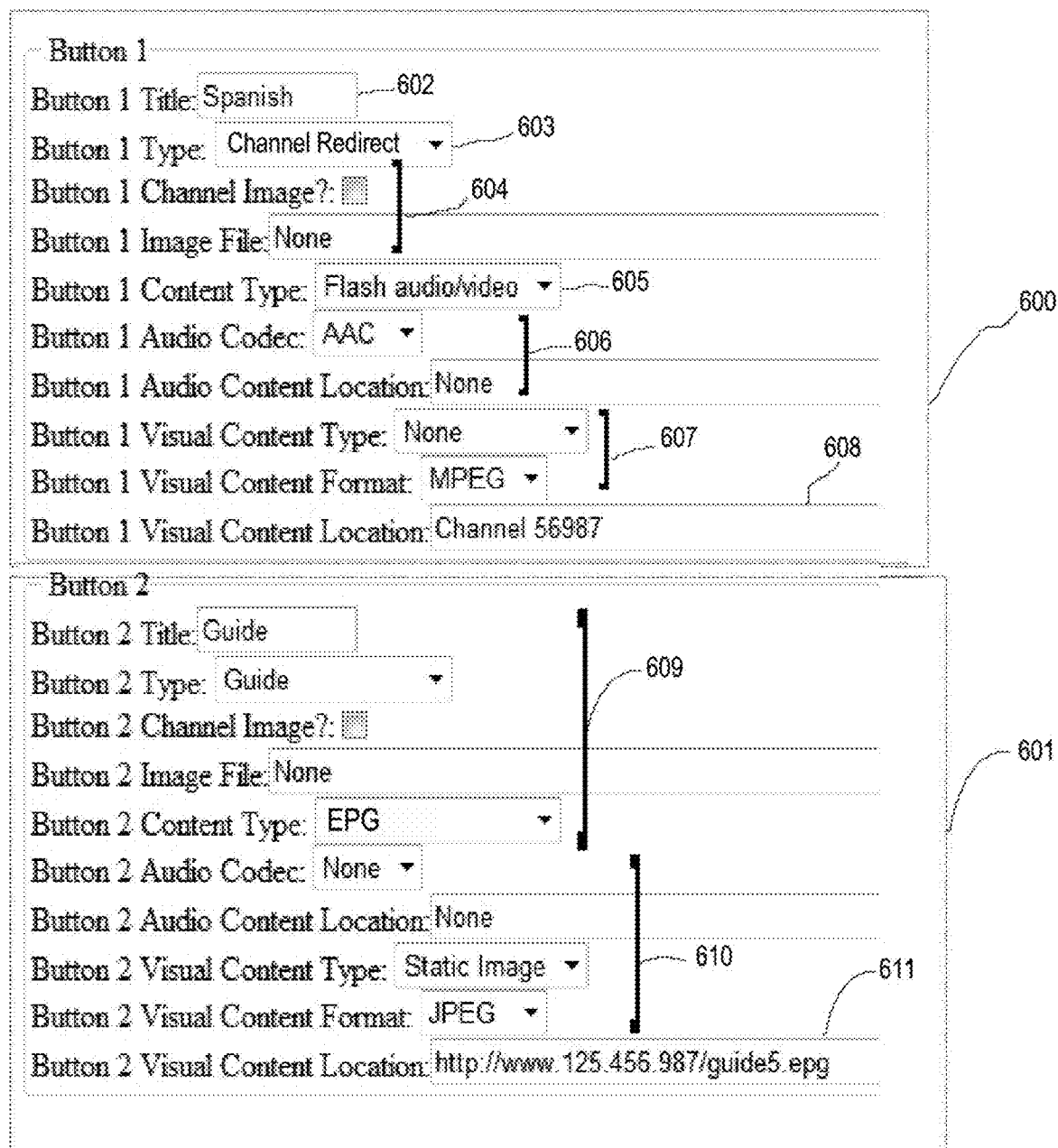
FIG. 6 illustrates an exemplary channel button definition in the directory channel configuration, according to an embodiment.

FIG. 6 illustrates an example of button definition as a part of the directory channel configuration in an embodiment. This information depicted in FIG. 6 may be entered manually as shown in FIG. 6 or entered into a structured file. Two example button definitions 600 and 602 are illustrated in FIG. 6. The button definitions 600 and 602 depicted in FIG. 6 include fields such as:

a. Button 1 title 602
b. Button 1 type 603. In this example pressing this button will redirect the channel to another one, entered in the field 608.
c. Channel 1 image and file location 604
d. Content type that is associated with button 1, 605
e. Channel 1 audio codec and content location, if used 606
f. Channel 1 visual content type and format 607
g. Channel 1 visual content location. In this case a channel redirect to channel 56987 for an equivalent channel in Spanish 608
h. Button 2 title, type, image information, and content type, 609. In this example, pressing button 2 displays the program guide on the user's screen.
i. Audio and visual content information, if applicable 610
k. URL location of the visual content that is associated with pressing button 2. In this example, it is an EPG.

Button fields may also be associated with functions such as the URL of a website, initiating or ending a voice call to a content provider or advertiser, accessing video-on-demand, activating pan/zoom controls of a webcam, and other functions related to the content or service. These buttons may be defined in Directory Servers and provide added functionality and interactivity.

Figure 7:
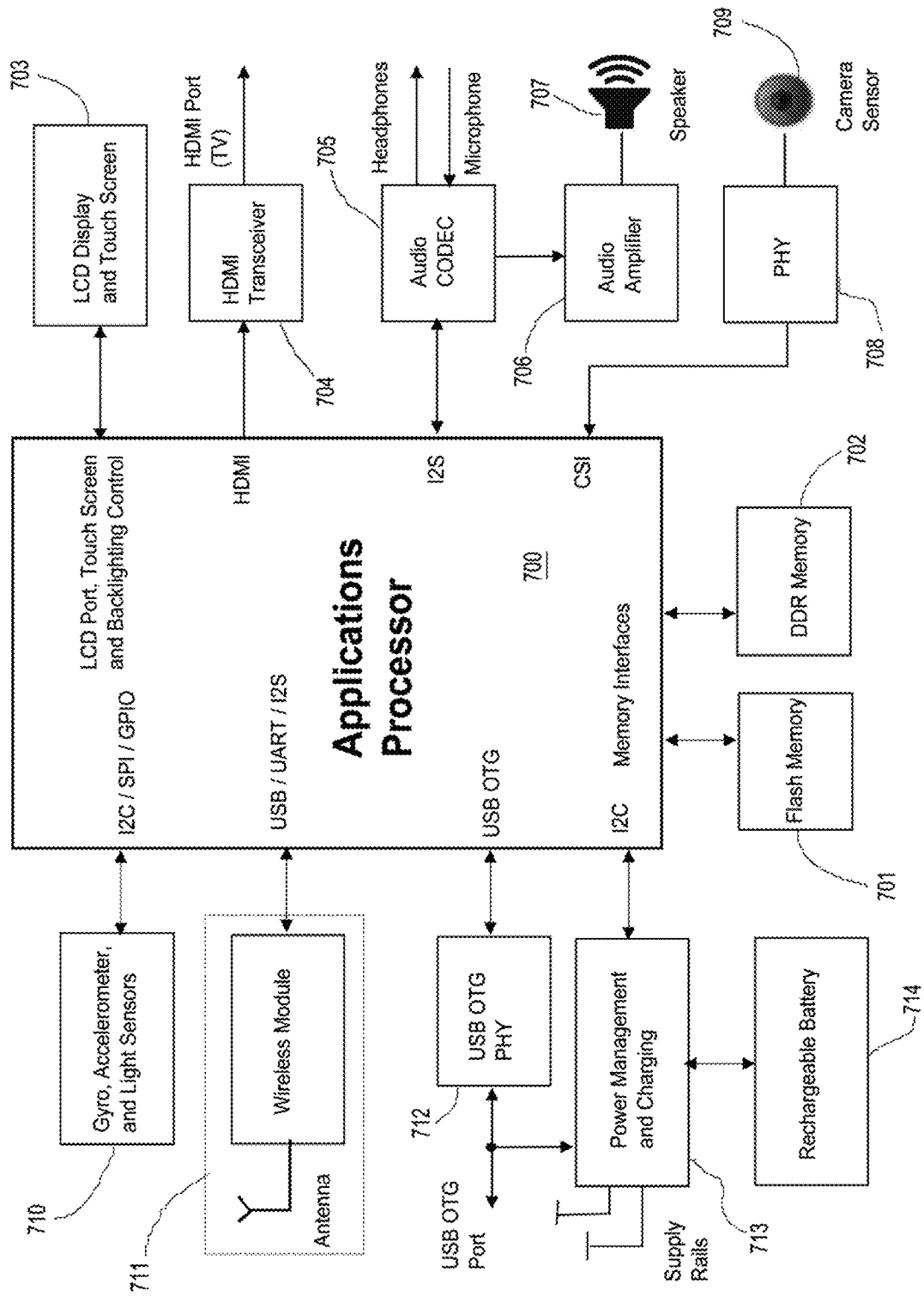
FIG. 7 illustrates a block diagram of selected hardware elements of an exemplary tablet computer, according to an embodiment.
Figure 8:
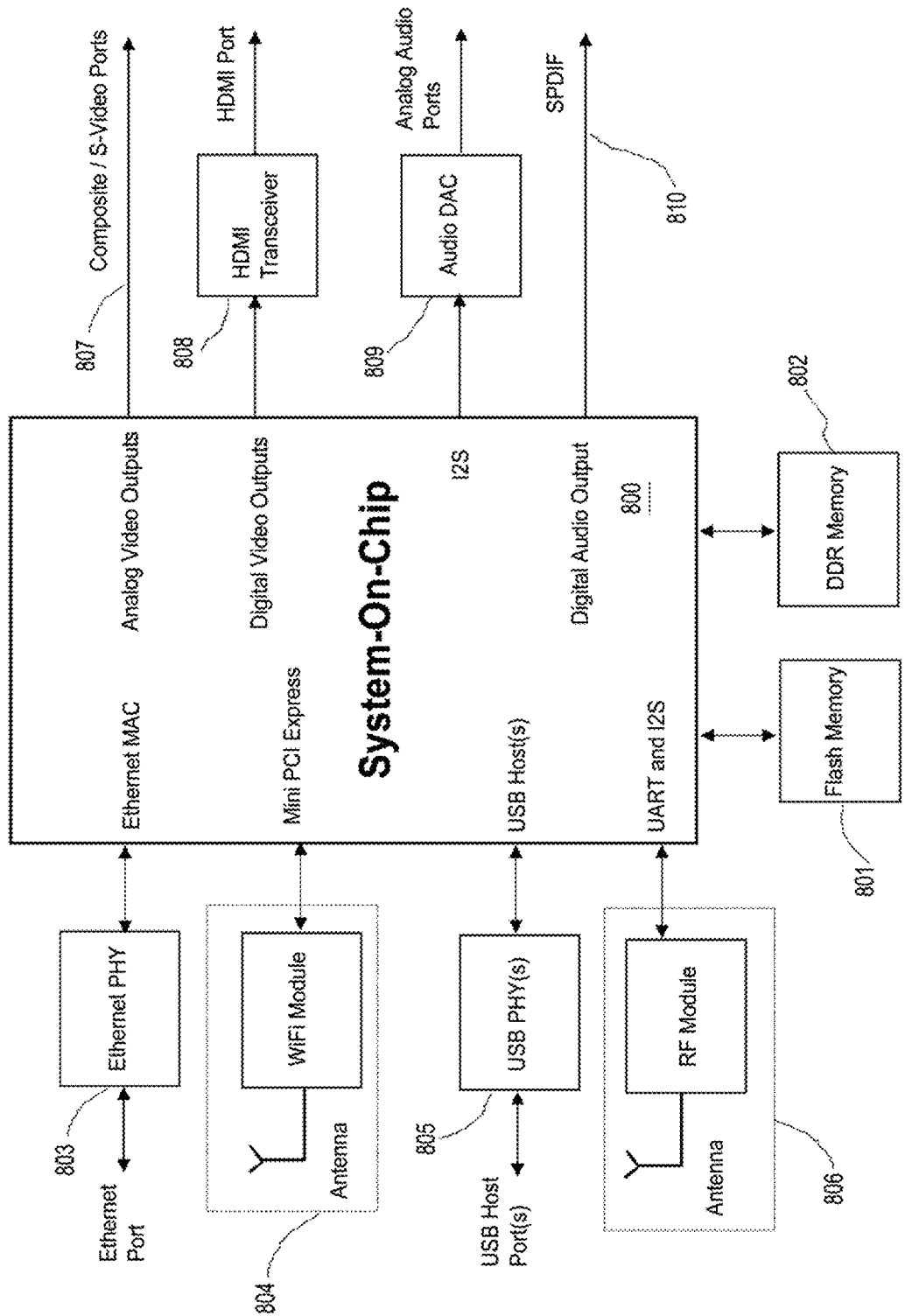
FIG. 8 illustrates a block diagram of selected hardware elements of an exemplary Over-The-Top (OTT) box, according to an embodiment.

FIG. 7 depicts one example embodiment of components of a user device, and FIG. 8 depicts one example embodiment of an OTT box. Other embodiments are possible, such as a tablet with an external remote controller or a public information terminal with an integrated screen, but a separate keyboard. Devices with other means of user inputs such as voice commands and/or those with alternate displays, such as a heads-up display are possible using hardware building blocks and associated drivers that are known to those skilled in the art.

An MST client software module embodiment is depicted in FIG. 9-10, and FIG. 13-18. The MST client software module can operate on either hardware embodiment device and may be enabled for a touch screen or an external controller or keyboard. The embodiment also includes server-side architecture and software module description. Server-side architecture may be configured to communicate with MST client software module residing on either hardware embodiment.

FIG. 7 illustrates a block diagram of selected hardware elements of an exemplary tablet computer. FIG. 7 shows an applications processor integrated circuit 700, such as the Nvidia Tegra 3, Texas Instruments OMAP 4430 or ZiiLabs ZMS-20, integrating one or more processor cores, one or more graphics accelerators or processors, memory interfaces, a display interface, a touch screen controller, serial interfaces such as I2S, I2C, SPI, USB, and other functions. Such processors are generally optimized for tablet computers and smart phones. Some of the listed functions may be external to the processors, depending on the particular device. FIG. 7 also shows flash 701 and double data rate random access memory (DDR RAM) 702 memory devices to store the operating system and application programs. Other blocks include an LCD display and a touch screen controller 703 for the purpose of managing the LCD display and user inputs. A light sensor many be used to monitor the light conditions and adjust the back lighting for optimum user experience and power consumption. An HDMI transceiver 704 allows the tablet to connect to external TVs and displays. Other blocks shown on FIG. 7 also include a CMOS camera sensor 709 and associated physical layer device (PHY) 708, an audio codec 705 with a headphone and microphone interfaces. An external audio amplifier 706 drives one or more speakers 707. A power management and charging block 713 receives power from an external source, such as an AC/DC adapter with a micro-USB style output jack. The power management block features a charger to charge an on-board battery 714 with power derived from the external adapter and to derive power from the battery when the external adapter is not connected. The power management block features several DC-DC power regulators and one or more linear (or low-dropout) voltage regulators to generate the power supply rails that are required by the system, such as 1.2V, 1.8V, and 3.3V. FIG. 7 also shows a sensor block 710 which includes an accelerometer and a gyroscope which are used by the system software for such functions as determining whether the screen is being held in the portrait or landscape mode or gaming. The sensor block 710 also features the light sensor, which was mentioned earlier. A USB PHY device 712 is also shown to provide USB OTG functionality for connection to such peripherals as an external cellular radio module. FIG. 7 also shows a wireless communication module with Wi-Fi and Bluetooth radios, baseband controllers, and antenna 711. The wireless module 711 enables communication with Wi-Fi routers and Bluetooth peripherals such as headsets or keyboards. Other peripherals commonly found in tablets are not shown on FIG. 7 for brevity. Other peripherals may include a GPS receiver for precise location information or an SDIO socket for external modular memory storage. It should be noted that applications processor manufacturers, such as Nvidia, Texas Instruments, or ZiiLabs, and third party design houses provide manufacturing reference designs with board support packages for popular operating systems.

FIG. 8 illustrates a block diagram of selected hardware elements of an exemplary OTT box. The OTT box may include a system-on-chip (SoC) processor 800 designed for IPTV or STB applications. The SoC may combine one or more processor cores (such as those from MIPS or ARM) with one or more video, graphics, and audio accelerators or digital signal processors. The SoC may also feature analog and digital audio and video encoders and drivers with standard analog TV interface ports such as composite or S-Video 807 or digital HDMI via a transceiver 808. FIG. 8 shows an interface to Ethernet via a PHY device 803 and to USB ports via one or more USB PHY devices 805. The block diagram also shows a Wi-Fi module 804 which may interface to the SoC through its Mini PCI Express. It may also be external to the OTT box and connect through a USB port. The SoC may also feature serial interfaces such as UART, I2S, I2C (not shown), SPI (not shown), SPDIF 810 and others. An Audio DAC 809 may be used to provide analog audio interfaces to TVs and other devices. The SOC may feature an RF module 806 for communication with RF-based remote controllers, keyboards, and other peripherals. FIG. 8 also shows flash memory 801 and DDR memory 802 which interface to the memory ports on the SoC. The OTT box also include a power management subsystem (not shown), clock generation, and other components that are not shown in FIG. 8 for brevity. It should be noted that hardware architectures may vary between semiconductor and hardware platforms and that some SoCs may integrate functions that others do not and need to be provided externally.

Figure 9:
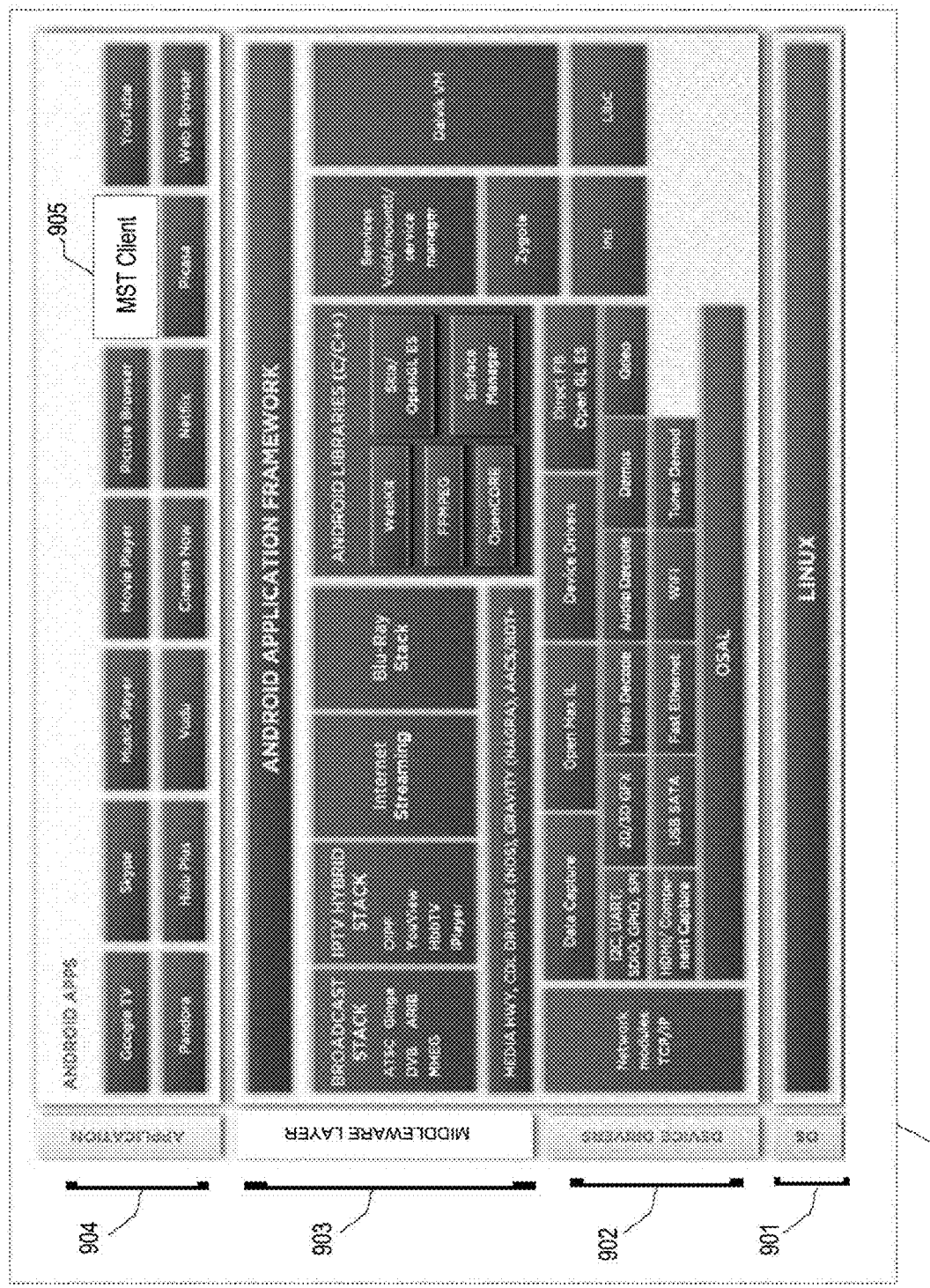
FIG. 9 illustrates selected elements of the system software architecture of an exemplary user device with a MST client, according to an embodiment.

FIG. 9 illustrates selected elements of the system software architecture of an exemplary user device with an MST client module according to one embodiment of the invention. One embodiment may be based on the mobile operating system with added software modules for content and services operation. Other operating systems with similar software elements are also available.

FIG. 9 shows the layered software architecture and selected components used in the MST client in one block 900. The Linux kernel 901 is the base operating system for Android. Device drivers 902 provide hardware interfaces to such components as Wi-Fi, Ethernet, USB, and video interfaces. The middleware layer 903 includes a library of software optimized for streaming media on tablets and IPTVs. The middleware layer 903 also includes standard Android libraries, the Dalvik virtual machine, and services management. The middleware layer 903 also features the Android application framework, a set of application Programming Interfaces (APIs) that allow developers to quickly develop applications. These APIs provide an interface between the application layer 904 and the rest of the middleware layer 903. The Application layer 904 may include several applications that are provided by Google as a part of its Android and Google TV packages such as a web browser, Skype, and a picture viewer. The MST client 905 runs on the application layer 904. The MST client features a Channel Tuner application which provides the user interface, user registration and authentication, access to channel content and services, management of user settings and preferences, audio and video media playing, voice and video telephony, and other functions. This software module uses the middleware layer 903 and lower layer functions listed in 902 and 901. It should be noted that the software architecture of Android is well documented and that its SDK enables software application development (such as the MST client module 905) using standard programming languages such as Java.

Figure 10:
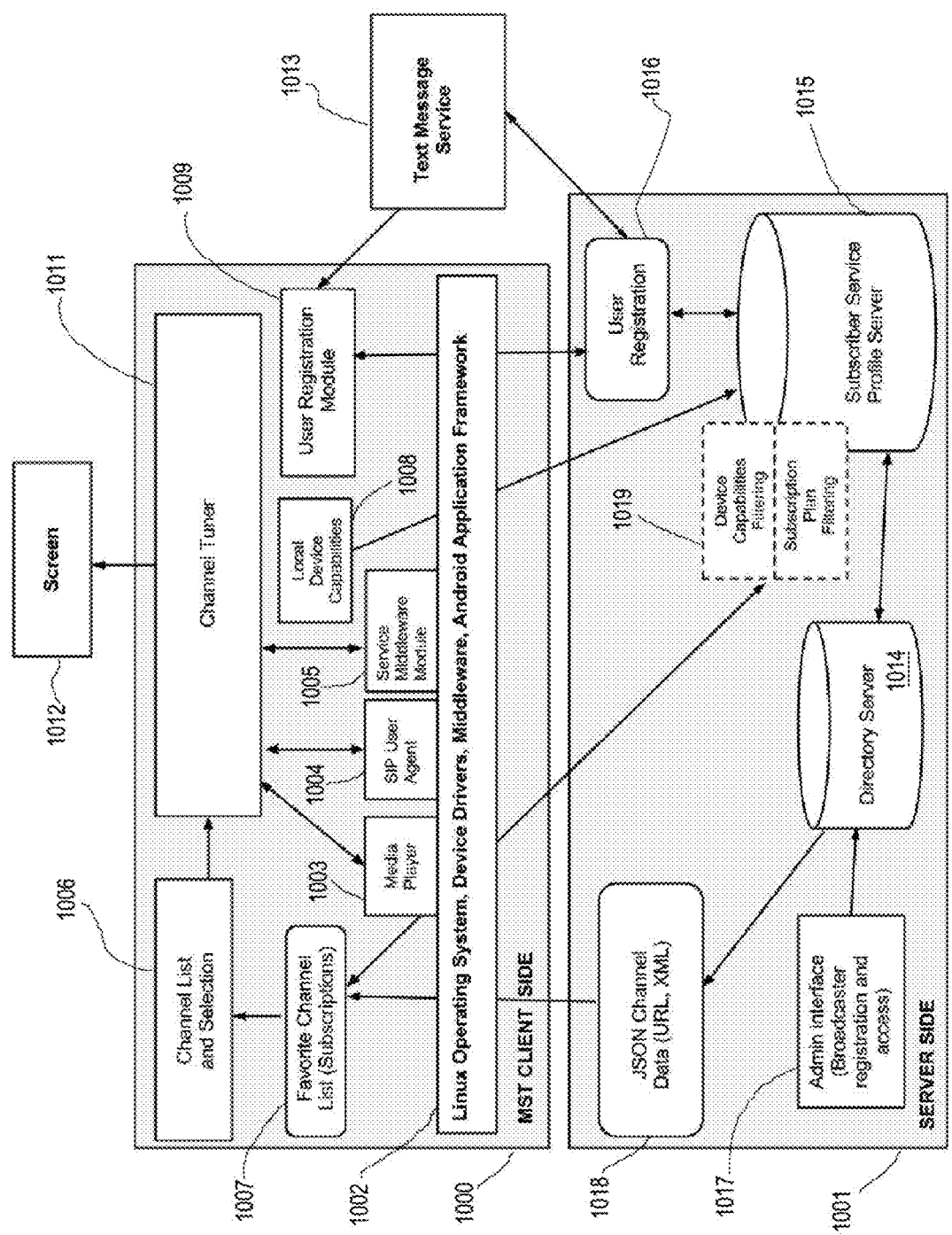
FIG. 10 illustrates an example of high-level software architecture of the MST client and selected servers, according to an embodiment.

FIG. 10 illustrates one embodiment of software architecture of the MST client software module and selected servers. The top box 1000 shows selected software components in the MST client, while the bottom box 1001 shows selected software components in the Directory and SSPS. The operating system, device drivers, middleware, and application framework are shown as a single layer 1002 for simplicity, but they are separate components. FIG. 9 provides a more layered listing of these software modules. It should be noted that the media player 1003 and SIP user agent 1004 are shown as separate boxes. These software modules may be part of the middleware. Other middleware applications may be available from third parties and may be used instead of, or in addition to, the software that may be provided as a part of the standard distribution. The operating system depicted is a modular operating system and supports the use of alternate drivers or middleware modules. A generic service middleware module 1005 is also shown in FIG. 10 to illustrate the possible use of such middleware in conjunction with some services, such as those required for online gaming. Specialized middleware may be a part of embodiments, third-party provided software or a combination of both. In embodiments, the MST client software module may be upgradeable to support new types of content and services by third parties. Gaming middleware may include such functions as graphics rendering, animation, modeling, texturing, special effects, or game controller interfacing.

The MST client 1000 may include a user registration module 1009. This module may be used to authenticate the user. During initial setup, the user may be prompted to provide his/her telephone number, which may then be verified through an external text message service 1013. Performed as a service by third-party providers, the text message service 1013 may generate a text message (if the user provided number belongs to a mobile telephone) or may initiate an incoming call with an automated voice message (not shown) if it is a landline telephone. The user enters the code that is sent over SMS or read by the automated voice message in order to confirm his or her telephone number. Some embodiments may use the telephone number of the user as a customer ID. Therefore, embodiments may incorporate voice communication alongside multimedia services. The user's telephone number may also be assigned as a channel number to enable the user to become a "broadcaster".

Upon powering up or launch or at repetitive intervals, the MST client software module 1000 may be configured to refresh the list of favorite channels 1007 based on data received from the SSPS 1015 and display the last accessed channel (if known) on the TV or tablet screen. Otherwise, it displays the list of favorite channels, which it may store locally or retrieve from the SSPS. The MST client software module may include software for detecting local device capabilities of the user device 1008 and communicating this information to the SSPS 1015. This information may include the type of device (TV, set-top box, gaming console, etc), manufacturer, model, hardware build revision, operating system software revision, revision number of the MST client module, display type (SD, HD, 3D, etc), what peripherals are connected to the device (such as a webcam, blood pressure monitor, game controller and details about their make, and drivers).

This information may be used by the SSPS 1015 to determine the type of content and services that are compatible with the user's device.

FIG. 10 also depicts the Channel Tuner 1011 of the MST client software module 1000. The Channel Tuner 1011 may provide user interface functions for receiving commands input by the user on an interface of the user device, such as touch screen, keypad or remote control button inputs. Responsive to receiving the input commands, Channel Tuner 1011 may determine the desired channel or navigation action. In response to inputting commands on the user device, the Channel Tuner 1011 may update the display screen or TV 1012 with such information as the decoded channel number and name if it matches an entry in the locally-stored channel list. Next, the Channel Tuner 1011 software module sends a request to the (Channel) Directory Server 1014 using a data interchange format, such as JavaScript Object Notation (JSON) 1018 with the user's requested channel. In embodiments, the Directory Server 1014 provides a response with the URL or URLs which contains the location(s) of the server that is associated with the desired content or service. The Channel Tuner 1011 may include logic which recognizes that address as belonging to a streaming media connection and invokes the Internet Streaming middleware to connect with and play that content. The operating media player may optimize the viewable and/or audio content based on the capabilities of the device, media and codec format, connection speeds, and other factors. It may directly support and/or interact with other software layers to enable functionality such as digital rights management (DRM), encryption, closed captioning, buffering, stopping, moving backward/forward, play list display, and other functions. In embodiments, a Directory Server 1014 may provide an error response indicating that the requested channel may not be available. This may be for a number of reasons such as the channel number being invalid or inactive, or that it requires subscription, or for other reasons. The Channel Tuner 1011 may be configured to manage the communication with the Directory Server 1014 and provide the user information on the TV or tablet screen 1012 about why the content may not available, such as when a paid subscription is required. It should be noted that some channels may feature user-selectable buttons or icons for interaction with content or services. Button operation may be communicated by a Directory Server 1014 as information indexed in a structured file. The Channel Tuner 1011 may also derive the button content information from other servers or from Metadata encoded by the media servers and transmitted alongside the content. The button-related information may include a text or graphical icon that is associated with the button and, more importantly, the desired action if the user presses that button. The Channel Tuner 1011 may be configured to transmit information configured to be displayed on the user device, such as the buttons and tracks the navigation actions of the user. If the user selects one of these buttons, the Channel Tuner 1011 performs the action that is associated with the button. The action may be a URL address redirect (to go to a streaming server address or to another related channel, for example), a program guide, making a telephone call, controlling a webcam, etc. The Channel Tuner 1011 may also be configured to support standard navigation buttons with arrows on the remote control (right, left, up, down, and select/OK) and well as touch screens and keyboards. It should be noted that entering channel numbers is not the only way that users can access services associated with some embodiments. Some embodiments include directories that allow the user to browse for and select contents or services. The MST client 1000 may include a software module 1006 for managing channel list and user selections. A Directory Server 1014 (or other servers) may feature one or more channels for directories and provide information to the Tuner based on the selections of the user's selections (content type, genre, sub-genres, geographic location, etc). In order to reduce or decrease the look up time, the channel list and selection module 1006 may locally buffer some of the directory contents for faster access. A list of favorite channels may also be locally stored by 1007.

The Channel Tuner 1011 supports on-demand content (such as video-on-demand and audio play lists) by means of parsing and processing structured files with Metadata about the content and their associated file location. Such structured files may follow industry-standard multimedia play list formats such m3u8 and Synchronized Multimedia Integration Language (SMIL). Variable bit rate streaming may also be supported, so locations of files encoded at different bit rates may also be provided. Streaming media player middleware may support variable bit rate streaming and may dynamically adjust the streaming speed and content location for optimum performance in light of broadband connection speed, delays and other factors. Streaming media player middleware may support also support captions, skinning, analytics, discovery, advertising, and Javascript execution. One example media player middleware is the JW Player from Longtail video. The Channel Tuner module 1011 may support communication with presence servers (not shown). This can be useful for intermittent broadcasters. If the user has a favorite channel with presence notification, a Directory Server 1014 may provide this information to a presence server which may track when the broadcaster is active and alert the user so that he or she may watch this content. The alert may be in the form of an SMS message or an automated voice call (in case the OTT box or TV are turned off, for example), a message or icon on the TV screen if it is on, or by some other means. The presence server may be stand-alone or a part of the SSPS 1015 or another server.

In embodiments, the Channel Tuner 1011 may be configured to support the ability of the user making and receiving voice and video telephony/conferencing calls. Disclosed embodiments may treat telephone numbers in a similar way as channel numbers. To make a voice and video telephone call, a Channel Tuner 1011 sends a query to the Directory Server 1014 with the telephone number as a channel number and the Directory Server 1014 provides the necessary SIP server address and other information to complete the call.

The MST client relies on middleware software modules for updating the user's MST software module. Android supports this type of capability through Google's Play store or third-party servers. The MST client also supports the ability of the user device to download software modules in order to access some services.

The server side software 1001 of some embodiments includes one or more Directory Servers 1014 with associated databases. Directory Servers 1014 may feature an administrative interface 1017 so that content and service providers may enter their general and contact information, channel number to URL or a structured file look up information, and button definition and action information. Directory Servers 1014 may receive inquiries from the MST clients 1000 for channels to be accessed and may query the SSPS 1015 in order to confirm the device capabilities and subscription requirements and status of the user. If the requested channel can be provided to the user, the channel information may be relayed to the MST client 1000 using a data interchange format such as the JavaScript Object Notation (JSON) 1018. The server-side data bases may also provide a list of supported channels or a list of favorite channels to the client software so it may buffer them locally by 1007. In order to protect communicated data associated with content and potential subscription revenues, encryption and other anti-piracy and digital rights management schemes may be implemented by the media servers, Directory Server 1014 and Channel Tuner 1011. The SSPS 1015 may include a user registration module 1016 which may be used to authenticate the user on initial and possibly subsequent accesses. The SSPS may also feature a module for device capabilities filtering and subscription plan filtering 1019.

In some disclosed embodiments, the Directory Server 1014 and SSPS 1015 may be built on top of an existing server platform, such as the one offered by the Google App Engine. This offers reduced administration costs and automatic scalability. A high level programming language, such as Python, combined with a pre-existing web application framework, such as the integrated webapp2 or Django, can offer ease of development and maintenance. Since channel Metadata can vary depending on the type of channel, a NoSQL solution, such as the one offered by the App Engine's High Replication Datastore, may be preferred since it can be more flexible than traditional relational data base management systems (RDBMS).

Figure 11:
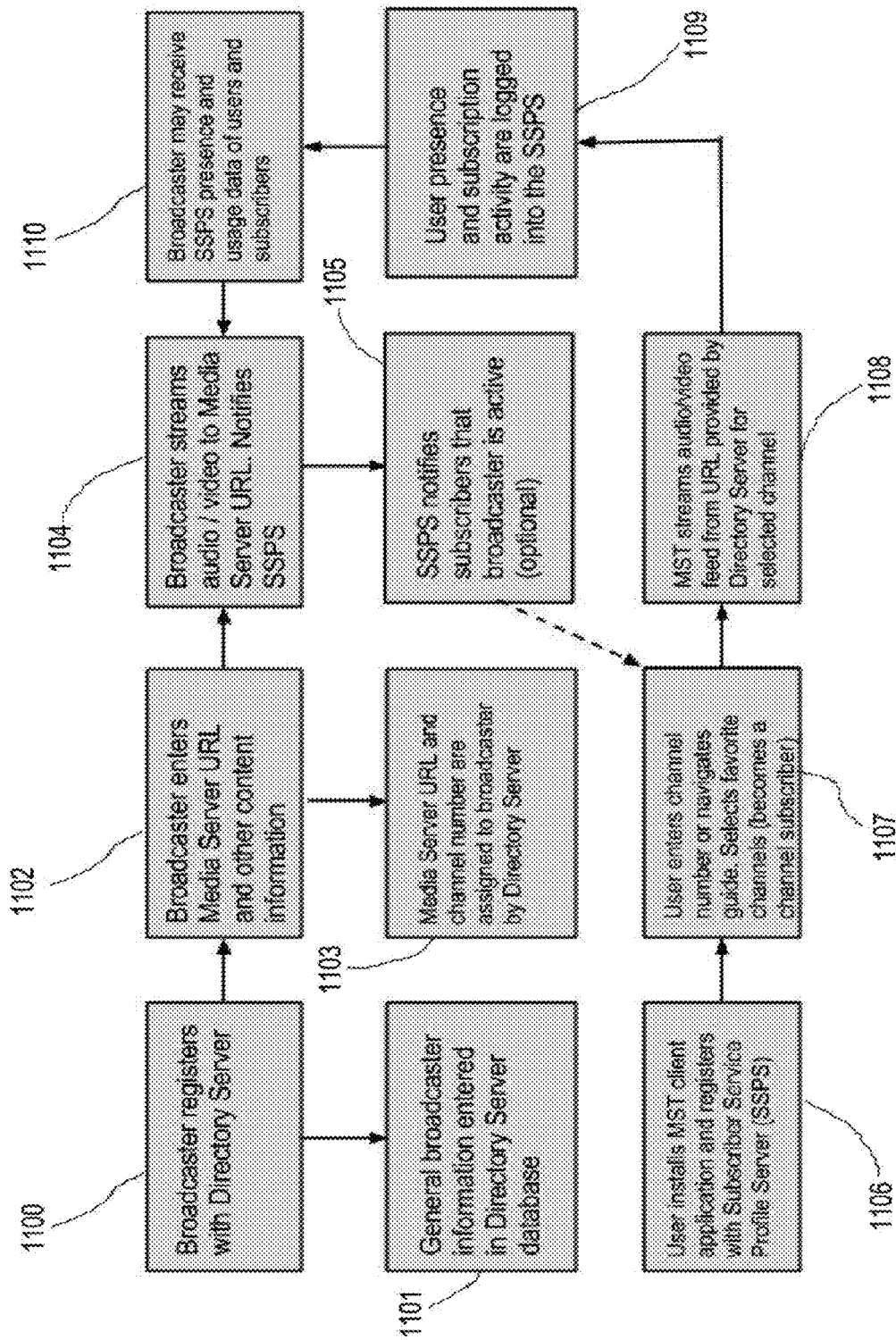
FIG. 11 illustrates an example registration and service access, according to an embodiment.

FIG. 11 illustrates an example registration and service access method according to an embodiment. The method depicts shows selected steps for a broadcaster to offer streaming media content to a user based on this disclosure. The steps of the presented below are intended to be illustrative. In some embodiments, the may be accomplished with one or more additional operations not described, and/or without one or more of the operations discussed. Additionally, the order in which the operations of the method and described below is not intended to be limiting. In some embodiments, the method may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of the method in response to instructions stored electronically on an electronic storage medium. The one or more processing devices may include one or more devices configured through hardware, firmware, and/or software to be specifically designed for execution of one or more of the operations of the method. FIG. 11 shows that the broadcaster may register his or her information with a Directory Server through an administration portal 1100. Such information may include the broadcaster name, address, telephone number, website address, technical and contact names, and other information. A broadcaster may be an individual, a traditional radio or TV broadcaster, an Internet or online broadcaster, a webcam operator, an advertising agency, etc. This information may be stored in a data base system as a part of a Directory Server 1101. Next, the broadcaster may enter channel-specific information, including channel name, description, genres and sub-genres, if appropriate, the URL of the streaming media server for the content, if it is a live channel, or downloads a structured file with encoded information if the content is on-demand, or a combination of the two (live and on-demand) 1102. The Directory Server then assigns one or more channel numbers to the channel 1103. Once channel information is entered, the Directory Server may test the links to ensure that they are active and that they are in a compatible format and if so, it enables the channel to become active and may notify the SSPS. These steps are not shown in FIG. 11 for brevity. Some channels may have intermittent content, such as live and not active. In order to support such channels, the streaming media server may notify a presence server (not shown) or the SSPS when a broadcaster is present or active 1104 so that subscribers may be alerted that the content is available 1105. One example may be a broadcaster using a video camera associated with his or her smart phone. When the broadcaster runs a compatible video streaming application on the smart phone, it notifies a presence server or the SSPS that he or she is present. Subscribers may be alerted that the broadcaster is available or active (streaming) through the presence function of the SSPS 1105 and the content may appear in guides and directories. If a subscriber tunes to a broadcaster's channel, the broadcaster may receive a presence notification 1110 so he or she may activate the video camera and start streaming 1104. This mechanism can help avoid wasting the time of the broadcaster if no one is watching and the subscriber's time if a channel is not broadcasting. It should be noted that this mechanism may also be used for other types of content and services.

On the user side, FIG. 11 shows that the user signs up with the system via registering with the SSPS 1106 through a website portal or through a user interface mechanism provided by the MST client. The user's telephone number may be used to identify the user during the initial and subsequent accesses. After registering, a user can enter a channel number or select one from a directory or a favorites list on an interface of a user device to access content and services that are associated with it 1107. This action may be provided by the MST client software module. The user may add a channel (accessible through a numeric entry or through a directory) to his or her favorite list and become a "subscriber" to that channel 1107. This may enable the user to access a channel in the future so the user does not have to remember the associated number of perform the directory look up again. After entering the channel number, the MST client receives the corresponding URL (or structured file) from the Directory Server and streams audio and video content 1108. The user's presence and subscription activity are logged into the SSPS 1109 and the broadcaster may receive presence and usage information from the SSPS 1110.

It should be noted that following registration, that access to communication and other services may be very similar to example the flow that is shown in FIG. 11 Furthermore, some content types may require a paid subscription and this may be handled through third-party subscription and billing servers (not shown). The channel access mechanism may be very similar, though, as the Directory Server communicates with a subscription server (either the SSPS, a third-party subscription sever either directly or indirectly through the SSPS) to verify access information. Encryption, frequent re-directions of stream locations, and other techniques may be used to protect against unauthorized access.

Figure 12:
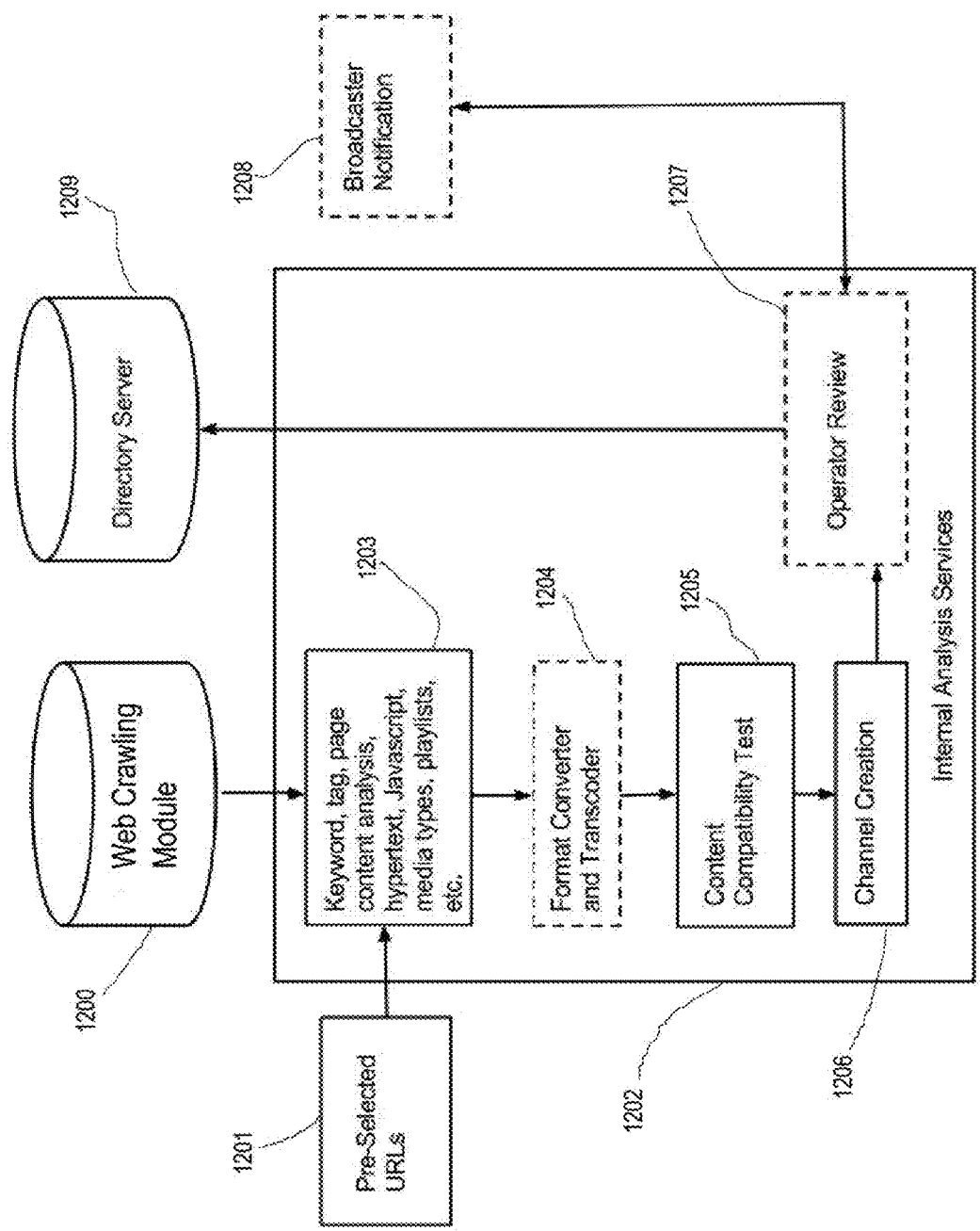
FIG. 12 illustrates an exemplary automated channel generation diagram, according to an embodiment.

FIG. 12 shows an exemplary automated channel generation diagram according to an embodiment. The embodiment includes a system and method for crawling World Wide Web sites and identifying content and/or services, indexing them and assigning channels to them. The channel numbers may be the same as the telephone numbers that are associated with the website owner (such as a corporation or a radio or TV station), or may be some other numbers Links to content and/or services may be extracted based on Hypertext entries in the language used for the site (such as HTML or JavaScript). FIG. 12 shows web crawling software module 1200, such as the Ficstar Web Grabber or the open source Apache Nutch. An internal analysis services module 1202 is shown for performing the searches and validating the results. The web crawling software 1200 may be configured to search the worldwide web for sites based on keywords, tags, page content analysis, hypertext, JavaScript code, play lists, media types, and other Metadata information 1203. A post-processing software module employing statistical modeling and machine learning techniques may be used in 1202 to eliminate false positive hits from the list of websites identified by the web crawling software. A software module 1201 allows the entry of pre-selected URLs to be used for analysis by the system. This list may include URLs obtained from directories, search engine research, or may be manually entered. They may also include URLs of sites already analyzed as well as URLs of sites linked to them. The pre-selected URLs entered into software module 1201 may be set to bypass the above-referenced post-processing software. The web crawling software 1200 may also be instructed to exclude these URLs. A format converter 1204 may be used to convert media files from one format to another. One example may be converting images found on a website from PNG to JPEG formats. The format of media files may also adjust the size for compatibility with the MST client. The format converter 1204 may also be used to translate text from one language to another. A media transcoder also in 1204 may be used to convert audio and video files or streams from one format to another one for compatibility with the MST client software module. One example may be converting a streaming audio file from MP3 to AAC formats. An embodiment may feature a software module that tests the validity of the content and performs compatibility tests with MST clients 1205. A channel creation module 1206 may generate a channel incorporating information, content and links derived from content compatibility test 1205, converted if necessary in an operator's review 1207 and found to be compatible with the MST client in a broadcaster notification 1208. One example might be to create a channel for a radio station which features a live audio stream to one URL, an image slide show combining JPEG images found on the website and relating to the station's hosts, events, music stars, and logo or derived from other websites, directories, online services or other channels. The channel may also include some content that may available on demand, such as video clips of upcoming concerts. The channel creation in the software module 1206 may also assigns a channel number based on pre-defined rules. For quality reasons, the created channel may be further reviewed by human operators 1207. In order to scale up, the human review process 1207 may be performed by a crowd sourcing system such as the Amazon Mechanical Turk (MTurk). An embodiment may include a module to communicate with a "broadcaster" (such as a radio or TV station, business, governmental entity, etc.) as to the pre-populated channel that it is in process of creating so that he may review it and edit it if necessary 1208. Once the process described in the analysis module 1202 is completed, the channel information is entered into the Directory Server 1209. The content or service can then be found by the end user in the channel directories and can be accessed by entering the corresponding channel number. In order to refresh content and avoid broken URL links, the website's URL may be added to a list in 1201 so the content may be updated from time to time using the same process described here. It should be noted that some complementary content may be added to the created to new channels to enhance the user experience. For example, a newly created channel for an Italian restaurant may include a slide show of images found on the restaurant's website. The slide show may be augmented with pictures taken by guests of the restaurant and featured on another website. Also, in order to make the viewing of the slide show interesting, a URL link corresponding to a stream of romantic Italian music may be added to the channel so it may play when the user views the slide show. At time of channel creation in 1206, the software in an embodiment may look on other websites (Facebook, Yelp, etc.) for reviews to include in the channel creation. User interaction with the channel, which was described earlier, may be supported. One example may be a call button that allows the user to initiate a telephone call to the restaurant in order to make a reservation. In summary, the system and method that are described in FIG. 12 enable the creation of channels optimized for viewing on a screen such as a TV without the use of web browsers. This embodiment is not limited to applications with numerically addressable channels, but may also be used in traditional systems that use directories and search.

Figure 13:
FIG. 13 illustrates an example streaming media display generated by an MST client application, according to an embodiment.

FIG. 13 shows an example streaming media display on MST client, according to an embodiment. A still screen shot is shown 1300. The screen shot includes the streamed media and may include the channel number 1301 that corresponds to a URL for a web provider and channel name 1302.

Figure 14:
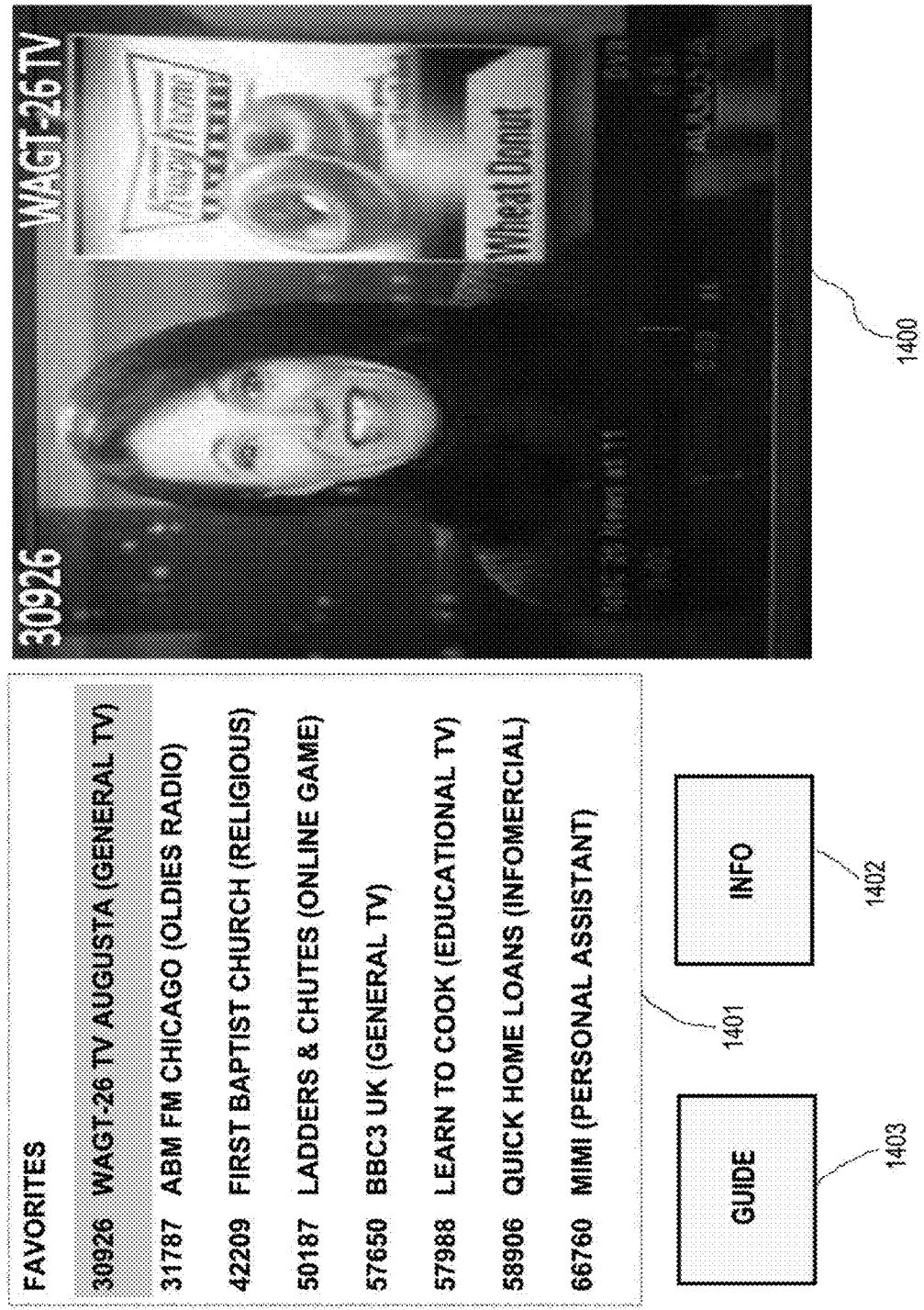
FIG. 14 illustrates an example MST client user interface showing a Favorites List, according to an embodiment.

FIG. 14 illustrates an example MST client user interface showing a favorites list for a user according to an embodiment. On a tablet computer with the MST client, the user may slide perform interactions on a graphical user interface to access and interact with the favorites list. On a smart TV or an OTT box with MST client, the user may press the favorites button on the remote control to access and interact with the favorites list. Other schemes may exist, depending on the capabilities of the user device to access and interact with the favorites list. In this example, the favorites list and function buttons may appear on the left side of the screen 1401 while the displayed video may be compressed to the right as shown in 1400 or be partially obstructed by the menu. The list of favorite channels may be organized in numerical order as seen in 1401. If the user is currently accessing content from the favorite list, the channel may be highlighted. The user may navigate through the list by using standard navigation means or buttons provided by his or her device and select a channel to access. On a touch-screen enabled device, this may be done by interacting with the entry on the graphical user interface of the touch-screen enabled device. On remote control units, this may be accomplished by pressing a select or OK button. An Info button 1402 may be selected to view additional channel related information. A guide button 1403 may be selected to access a program guide for the highlighted channel. Other buttons are not shown and may appear if the user slides from the bottom of the screen towards the top on a device with a touch screen. These buttons may support the ability to delete an entry from the favorites list, performing searches in the list, or exiting this mode. The user may also exit this mode by sliding from the right edge of the screen towards the left. On devices with a remote control or a keyboard, similar functionality may be achieved by pressing corresponding buttons.

Figure 15:
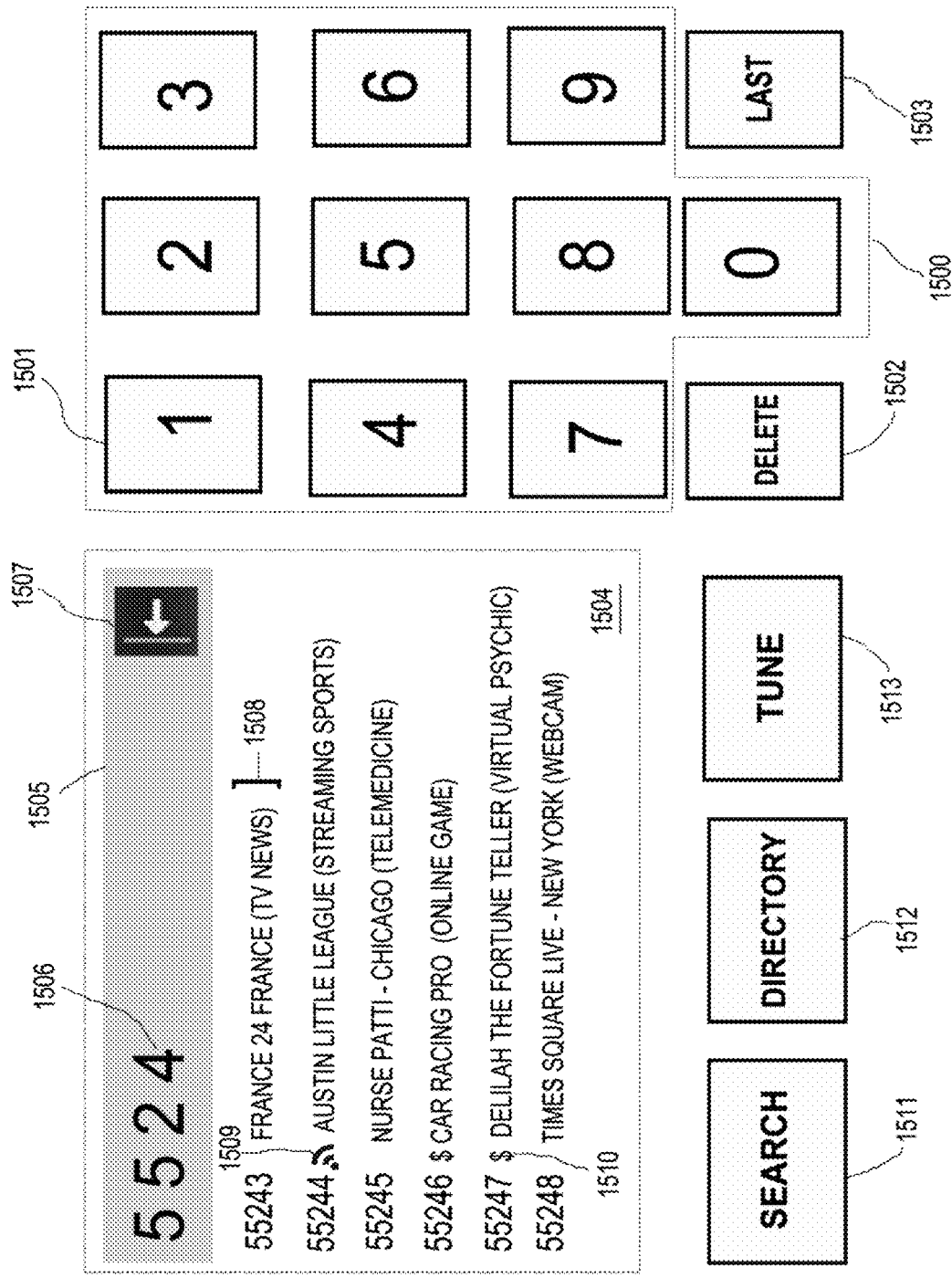
FIG. 15 shows an example MST client user interface showing channel number entry, according to an embodiment.

FIG. 15 shows an example MST client user interface showing channel number entry according to an embodiment. On a tablet computer with the MST client, the user may perform actions on the screen of a graphical user interface to input commands. This screen example may be suitable for use with OTT boxes with a non-numeric remote control unit, such as the Roku2, which only feature simple navigation buttons. In FIG. 15, numeric buttons 0-9 are shown in 1500. To enter a channel number, the user may select the corresponding digits, such as the 1 key in 1501. Applications with a full remote control (with numbers) or keyboard, the keys shown in 1500 may be taken out since the user can directly press the desired keys. A highlighted box 1505 may show the entered digits as they are entered. The user may select the delete function 1502 in order to delete the entire entered numeric string and start over. A last function 1503 may bring up the last entered and tuned channel number. A delete digit function 1507 may be used to delete the last digit. A displayed list 1504 corresponds to the entered digit string. It may narrow the selection options as more digits are entered. The user may enter the complete channel number to access the corresponding channel, or navigate and select on the entries on the list, or select the tune function 1513. Once a complete channel number is entered or an entry is selected by the user on the user device, the Channel Tuner performs the tuning by accessing the content or service that is associated with the channel. Each entry on the list, such as 1508, may include the channel number, name and brief description. In embodiments, a live icon 1509 after a channel number may indicate that a channel is streaming live. The dollar sign icon 1510 after a channel number may indicate that the corresponding channel may require a paid subscription. A search function 1511 may be available to enable users to perform an alpha-numeric search by channel name or based on content type or other information. When selected, a QWERTY keyboard may be displayed to facilitate the search. A directory function 1512 provides the user the ability to look for and select content or services based organized in menu-based directories.

Figure 16:
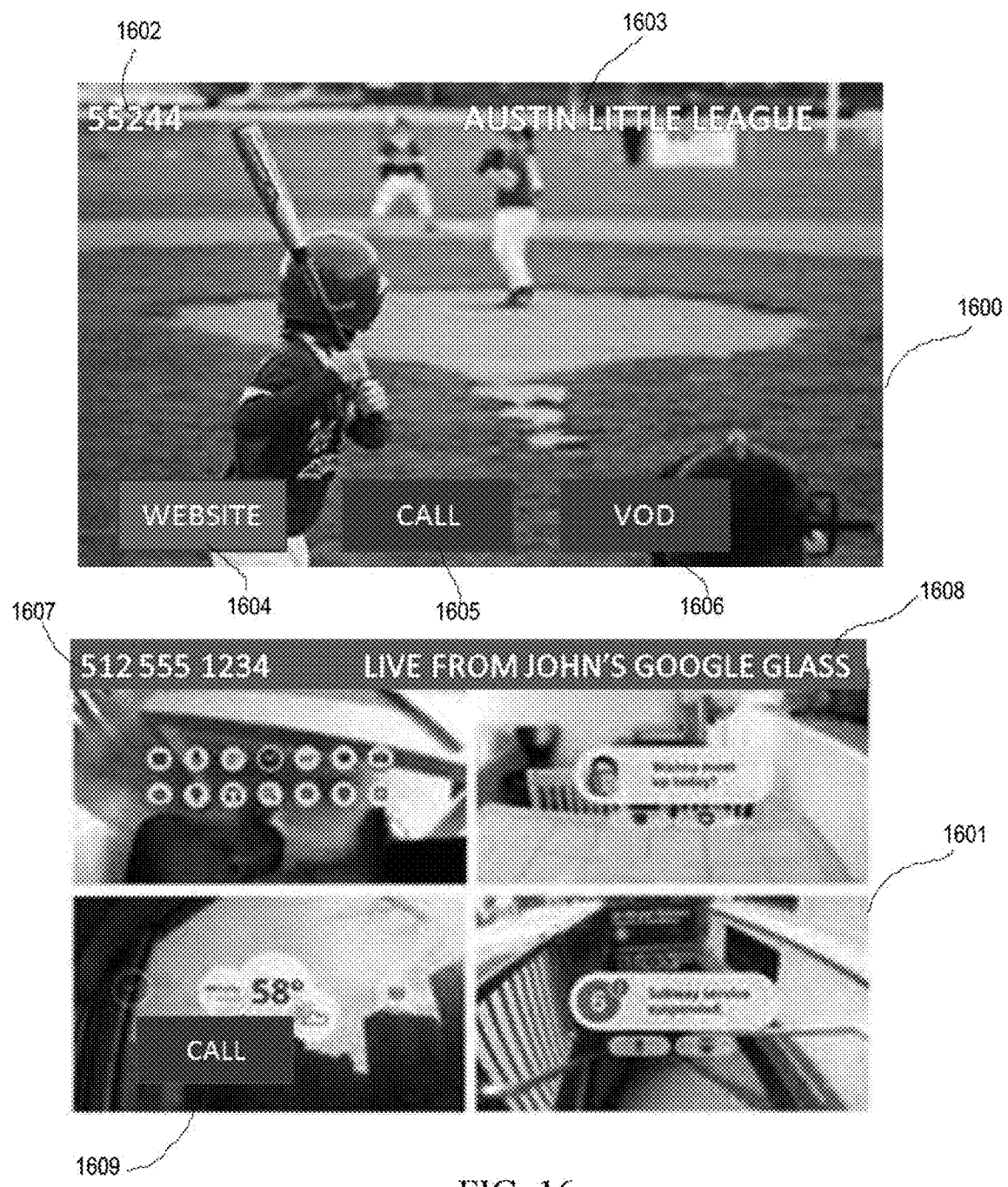
FIG. 16 shows two use case examples on a screen, according to an embodiment.

FIG. 16 shows two example embodiments presented on a display of a user device. The first example 1600 shows a use case of a little league game being streamed on channel 55244, identified by the numbers shown on the top left corner 1602. The channel name is shown on the top right corner 1603. Buttons allow the user to access the team's website 1604, place a call to the team 1605, or access related VOD content 1606.

The second example 1601 is the view from a video camera associated with a smart phone, such as the Google Glass. In this example, the user may view the live view from the Google Glass and call the person wearing it 1609. The telephone number may be used as both a channel number 1607 and as a telephone number for calling or texting. The channel name is shown on the top right corner of the screen 1608. The SSPS may provide presence information to both subscriber and "broadcaster" to encourage access to live content. The broadcaster in this example may have a public channel open to anyone or a private channel with access limited to a small list of friends and family members. The broadcaster may manage the list through a web portal that provides information to the SSPS so that access control may be performed in conjunction with a user or subscriber request to access it. The broadcaster may also receive or send invitations from/to users for access. The broadcaster may also perform such action in real time and accept or decline a request to access his or her content. Note that a server, such as a SIP server, may be used to stream the content from the broadcaster to subscribers. It may support one-way or two-way or conferring communication. Note that the ability to access and interact with live content from a device such as Google Glass may be controlled by its owner/broadcaster who may mute or turn off the access for privacy or other reasons. The channel content may also be dynamic. As an example, the broadcaster may switch the content source from a smart glass to a PC webcam when he/she arrive at home. The content may also revert to a video on demand list when not live. A great deal of flexibility can be supported as far as what content is available, to whom, when, and where.

Figure 17:
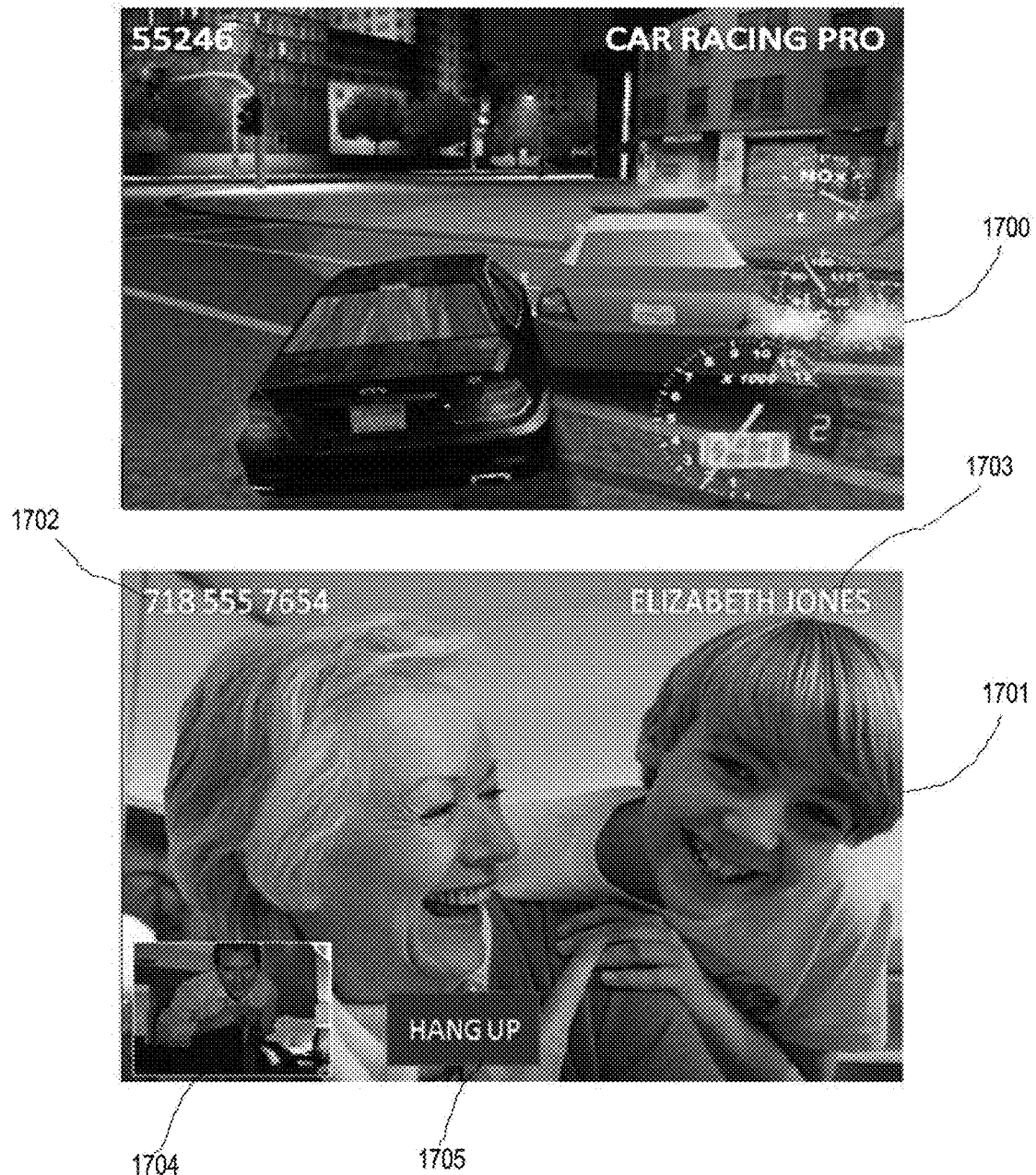
FIG. 17 shows two additional use case examples on a screen, according to an embodiment.

FIG. 17 shows two additional use example embodiments presented on a display of a user device. The first example 1700 shows a use case example associated with a car racing game. In this example, the game software may be located on a game server and the user's device provide navigation information based on the user's controls of a portable device (such as a tablet computer) or video game controller associated with a stationary device (such as an OTT box). In other embodiments, a game software module may be downloaded to the user's device and run locally. Hybrid implementations with some portions of the game software running on the local device and others remotely on a game server are possible.

The second example 1701 is a video conferencing call. In this example, the user "tunes" to channel 718 555 7654 which is displayed on the top left corner of the screen 1702. The channel number in this example is the same as the telephone number of Elizabeth Jones, whose name is shown in the top right corner of the screen 1703. The example 1701 shows a video call in progress. The caller's video is shown in the bottom right corner 1704 and a hang up button is shown in 1705.

Exemplary Channel Numbering Scheme

One embodiment provides an example numbering scheme that combines telephone numbers and other numbers that are logical and can be remembered by some users or if viewed sequentially would relate to a common geographic area or type of content or service. The example numbering scheme is selected so that it is a superset of popular channel numbers used by cable, telco, and satellite subscription TV providers. As was noted earlier, channel numbers assigned by these providers tend to vary by city or region. The selected channel numbering scheme may be chosen so that it does not conflict with channels that are assigned by the cable/telco/satellite providers and which tend to be from 1 to 9999. The proposed channel numbering scheme starts with 10000. This makes it possible for future telco, cable, and satellite TV STBs to incorporate the MST client software module and support OTT content and services in addition to the channels that are offered by the cable/telco/satellite service providers. It should be noted that many different numbering schemes are possible. The example provided below is for illustrating the operation of an embodiment.

The example numbering scheme also provides a consistent and non-conflicting access for local, national, and international applications and supports making telephone numbers as channels. It encompasses the following:

- 0—Guide of local channels, including public subscriber and telephone directories
- 01-0999: Premium Content
- 1-9999: Reserved (in order not to conflict with cable/telco/satellite) and over the air TV channels.
- 10 000-999 999: Assigned to Content and Service Providers, except: 1xxx0—Directory corresponding to channels, including service and telephone subscribers in the area code xxx. Example 15120 provides a directory of channels in the Central Texas area.
- 01 000-01 999 999: Assigned to international content or service providers, with the country code following the 01. For example, a UK-based radio station may be assigned the channel code 0144201. Note that 01 followed by the country code and 0 corresponds to the corresponding national directory of channels, including public subscriber and telephone directories. For example, 01440 corresponds to a UK directory. 0110 provides US and Canada directories.
- 7-digit numbers: Assigned to US and Canadian businesses based on their telephone numbers. The local area code of the user may be automatically added by the Directory Server to obtain the 10-digit complete telephone number.
- 10-digit numbers not beginning with 0: Correspond to US and Canadian telephone numbers. A 1 followed by 10 digits provided the same channels in order to accommodate North American dialing convention for long distance numbers.

01 followed by 7 or more digits: Corresponds to international telephone numbers. 011 followed by the number, provides the same channels in order to accommodate the international dialing convention from the US. 010 followed by the number also provides the same telephone number association in order to accommodate the international dialing convention in use in much of the world. 0101 followed by 10 digits also represent North American telephone numbers.

Other digit combinations are reserved.

An embodiment may relay on a timeout in order to determine the end of a channel number entry. This timeout may be set to 5 seconds, for example. However, some remote control units and touch screen software may have an Enter or Select button. If used, the MST client software module may interpret this as an indication that the channel number entry is complete. Some devices, such as telephones, may employ a special digit such as # to denote the end of channel entry or to enable the telephone to determine that this is not a entry associated with a plain telephone call, but as one potentially associated with an enhanced service or a multimedia content access. This method was described in U.S. Pat. No. 8,116, 808. The use of # or similar Data Termination Sequence (DTS) is envisioned in certain types of devices or applications.

It is possible that different channel numbers lead to the same channel or content. This is due to the fact that a content or service provider may have one or more abbreviated channel numbers (say a 5-digit number) in addition to the telephone number or other long channel number that may be associated with it. In other cases, some businesses may have multiple telephone numbers all leading to the same content or service.

Some embodiments may provide or restrict content or services to users depending on information in their SSPS, rules defined in one or more servers, subscription or lack of it, geographic location of the user, time of day, or other factors. The content or service options presented to the user may also depend on his or her profile or other factors. Some channels may be private and may not appear in public directories, or may not even be accessible to general users. Their access may be limited to a preselected group of users.

The channel numbering scheme is designed to be supported on many types of devices and terminals including, but not limited to, smart TVs, Plain Old Telephone Service (POTS) phones, VoIP telephones and videophones, smart phones, basic mobile phones, Personal Computers (PCs), tablets, and in-car entertainment systems. The range of services that are available to each class of terminal will depend on its capabilities. For example a POTS telephone set may only be able to call a radio station or listen to its broadcast in mono bandwidth-reduced manner, while a car radio may only be able to listen to broadcast radio, Internet radios, book-on-tape programs, and TV audio broadcasts.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system for a numeric directory server, the system comprising:
   one or more processors configured to execute computer program modules, the computer program modules comprising:
     a directory server request module configured to receive a request including instructions to provide user devices access to media content or online services, the request including a channel number;
     a database module configured to determine a plurality of uniform resource locators associated with the channel number within the received request, each uniform resource locator providing access to a corresponding server and being associated with the requested media content or online services, the plurality of uniform resource locators including a first selectable uniform resource locator associated with the channel number and a second selectable uniform resource locator associated with the channel number, the first selectable uniform resource locator being associated with live streaming media content, the second selectable uniform resource locator being associated with on-demand media content, and each uniform resource locator is different from the other uniform resource locators; and
     a data communication module configured to communicate the data associated with the media content or online services associated with the plurality of uniform resource locators.

2. The system of claim 1, further comprising:
   a database configured to store a mapping of the plurality of channel numbers and uniform resource locators; and
   a logic module configured to determine the plurality of uniform resource locators associated with the channel number within the received request based on comparing the channel number and the plurality of channel numbers stored within the database.

3. The system of claim 2, wherein the data communication module is further configured to transmit the information from the database, the transmitted information being configured to be stored locally at a user device at a location associated with the received request, wherein the user device is configured to query the locally stored information to determine uniform resource locations associated with corresponding channel numbers being generated in response to receiving user inputs by at the user device.

4. The system of claim 1, wherein the media content includes at least one of streaming media, a stream from a device with a camera configured to acquire and transmit pictures and video, an advertisement, a video infomercial, or interactive communication or media.

5. The system of claim 1, wherein the online services include at least one of an interactive gaming, video telephony, telemedicine, or interaction with an intelligent personal assistant.

6. A system comprising:
   one or more processors configured to execute computer program modules, the computer program modules comprising:
     a directory server request module configured to receive a request including instructions to provide user devices access to media content or online services, the request including a telephone number;

a database module configured to determine at least one uniform resource locator associated with the telephone number within the received request, the at least one uniform resource locator providing access to a corresponding server and being associated with the requested media content or online services; and a data communication module configured to communicate the data associated with the media content or online services associated with the at least one uniform resource locator.

7. The system of claim 1, wherein the directory server request module is configured to receive a content provider request from a content provider server to broadcast the media content or the online services to at least one of the user devices, the content provider request including a content provider uniform resource locator associated with the content provider server; and wherein the database module is configured to map a content provider channel number and the content provider uniform resource locator within the database to associate the content provider server with the content provider channel number.

8. A method comprising:
receiving, at a computing device, a request to provide access to user devices to content or services, the request including a channel number;
determining, using the computing device, a plurality of uniform resource locators associated with the channel number within the received request, each uniform resource locator providing access to a corresponding server and being associated with the requested content or services, the plurality of uniform resource locators including a first selectable uniform resource locator associated with the channel number and a second selectable uniform resource locator associated with the channel number, the first selectable uniform resource locator being associated with live streaming media content, the second selectable uniform resource locator being associated with on-demand media content, and each uniform resource locator is different from the other uniform resource locators;
transmitting, from the computing device, a notification indicating the plurality of uniform resource locators associated with the channel number; and
communicating, from the computing device, the data associated with the content or services associated with the plurality of uniform resource locators.

9. The method of claim 8, further comprising:
mapping, using the computing device, the plurality of channel numbers and uniform resource locators within a database; and
determining, using the computing device, the plurality of uniform resource locators associated with the channel number within the received request based on comparing the channel number and the plurality of channel numbers stored within the database.

10. The method of claim 9, further comprising transmitting, from the computing device, information contained in the database, wherein the transmitted information is configured to be locally stored at a user device associated with the received request, wherein the user device is configured to query the locally stored information to determine uniform resource locations associated with corresponding channel numbers.

11. The method of claim 8, wherein the content includes at least one of streaming media, a stream from a device with a camera configured to acquire and transmit pictures and video, an advertisement, a video infomercial, or interactive communication or media.

12. The method of claim 8, wherein the services include at least one of an interactive gaming, video telephony, telemedicine, or interaction with an intelligent personal assistant.

13. A method comprising:
receiving, at a computing device, a request to provide access to a first user device to streamed content from a second user device, the request including a telephone number;
determining, using the computing device, at least one uniform resource locator associated with the telephone number within the received request, the at least one uniform resource locator providing access to the streamed content of the second user device on a corresponding content server;
transmitting, from the computing device to the first user device, a notification indicating the at least one uniform resource locator associated with the telephone number; and
communicating, from the computing device to the first user device, data associated with the streamed content from the second user device.

14. The method of claim 8, further comprising:
receiving, at the computing device, a content provider request from a content provider server to broadcast content or services to at least one of the user devices, the content provider request including a uniform resource locator associated with the content provider server; and
mapping, using the computing device, a content provider channel number and the uniform resource locator associated with the content provider server within the database to associate the content provider server with the content provider channel number.

15. An apparatus for a user side device utilizing a numeric directory server, the apparatus comprising:
one or more processors configured to execute computer program modules, the computer program modules comprising:
an interface configured to receive commands associated with a channel number;
a communications module configured to transmit a request including the channel number to a directory server to receive access to media content or online services from one or more provider servers, and the communications module being configured to receive the media content or the online services over a broadband communications network associated with the request, wherein the media content or the online services are received as determined by a plurality of uniform resource locators associated with the channel number within the transmitted request, each uniform resource locator providing access to a corresponding provider server and being associated with the requested media content or online services, the plurality of uniform resource locators including a first selectable uniform resource locator associated with the channel number and a second uniform selectable resource locator associated with the channel number, the first selectable uniform resource locator being associated with live streaming media content, the second selectable uniform resource locator being associated with on-demand media content, and each uniform resource locator is different from the other uniform resource locators; and a display configured to present media associated with the received media content or the received online services.

16. The apparatus of claim 15, wherein the communications module is configured to transmit a user status notification including the channel number associated with the media content or the online services currently being received by the user side device, and the communications module being configured to receive a broadcast status notification from the directory server indicating a broadcast status of the media content or the online services associated with the plurality of uniform resource locators from the one or more provider servers.

17. The apparatus of claim 15, wherein the user side device is one of a smart TV, a tablet computer, or a smart phone.

18. The apparatus of claim 15, wherein the display is configured to be disposed externally from the user side device.

19. The apparatus of claim 15, wherein the user side device is one of a streaming media player, a blu-ray player, a game console, a set-top box, an Over-the-Top box, or a personal computer.

* * * * *